United States Patent [19]

Hirohashi et al.

[11] Patent Number: 5,349,463
[45] Date of Patent: Sep. 20, 1994

[54] OPTICAL RADIO REPEATER WITH SIGNAL QUALITY DETECTION

[75] Inventors: Kazutoshi Hirohashi, Yokohama; Hiroshi Horii, Tokyo; Hideo Koike, Kanagawa; Yoshiaki Yunoki, Tokyo; Tetsuo Fukasawa, Sagamihara; Susumu Katayama, Tokyo; Akio Yoshikawa, Kawasaki; Keishi Ushijima, Nagareyama; Takaaki Takeda, Fujisawa; Takeshi Nomoto, Yokohama; Michio Kikuta, Tokyo; Shunichi Shichijo, Yokosuka; Yoshiki Iwasaki, Yokohama, all of Japan

[73] Assignees: Victor Company of Japan, Yokohama; NTT Data Communications Systems Corporation, Tokyo, both of Japan

[21] Appl. No.: 68,572

[22] Filed: May 28, 1993

Related U.S. Application Data

[63] Continuation of Ser. No. 744,097, Aug. 13, 1991, abandoned.

[30] Foreign Application Priority Data

Aug. 17, 1990 [JP] Japan .................................. 2-216531
Nov. 24, 1990 [JP] Japan .................................. 2-319400

[51] Int. Cl.$^5$ ..................... H04B 10/00; H04B 10/16
[52] U.S. Cl. .................................... 359/174; 359/175; 359/176; 359/177; 455/20; 455/21; 375/3
[58] Field of Search ........ 359/172, 174, 175, 176–177; 375/3, 3.1; 455/20, 21

[56] References Cited

U.S. PATENT DOCUMENTS 3,895,186  7/1975  Yoshida ............................ 375/118
4,412,299  10/1983  Huffman ........................... 375/118

FOREIGN PATENT DOCUMENTS 0018325  1/1989  Japan ................................. 359/172
0117936  5/1991  Japan ................................. 359/174

Primary Examiner—Richard E. Chilcot, Jr.
Assistant Examiner—Richard Moller
Attorney, Agent, or Firm—Lowe, Price, LeBlanc & Becker

[57] ABSTRACT

An optical radio system includes a host device, an end device, and a repeater. The host device and the end device communicate with each other via the repeater by use of optical radio. The repeater includes a section for receiving a first light signal from one of the host device and the end device, a section for converting the received first light signal into a first electric signal, a section for frequency-converting the first electric signal into a second electric signal, and a section for generating a second light signal in response to the second electric signal and transmitting the generated second light signal. The repeater also includes a section for demodulating one of the first electric signal and the second electric signal into a baseband signal, a section for detecting a quality of the baseband signal, and a section for enabling transmission of the second light signal only when the detected quality of the baseband signal is equal to or greater than a predetermined quality.

16 Claims, 18 Drawing Sheets

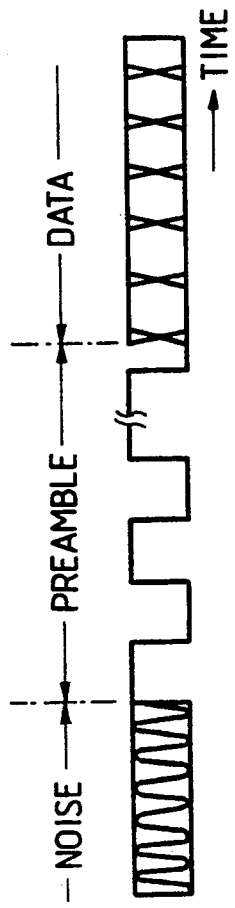
FIG. 5
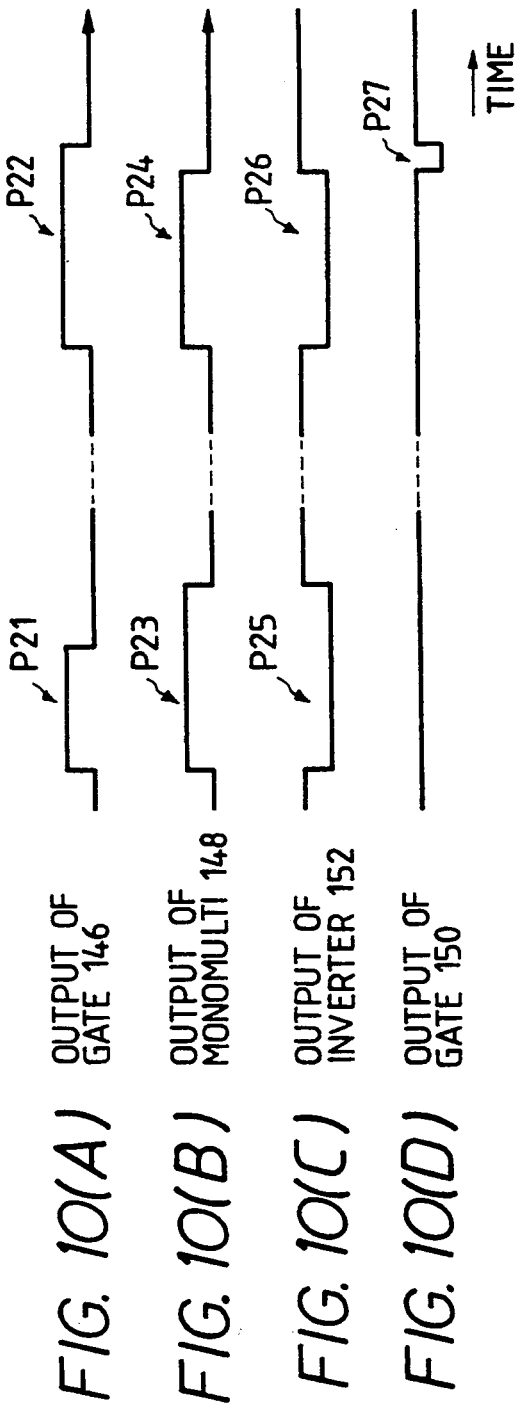
FIG. 10(A) OUTPUT OF GATE 146
FIG. 10(B) OUTPUT OF MONOMULTI 148
FIG. 10(C) OUTPUT OF INVERTER 152
FIG. 10(D) OUTPUT OF GATE 150

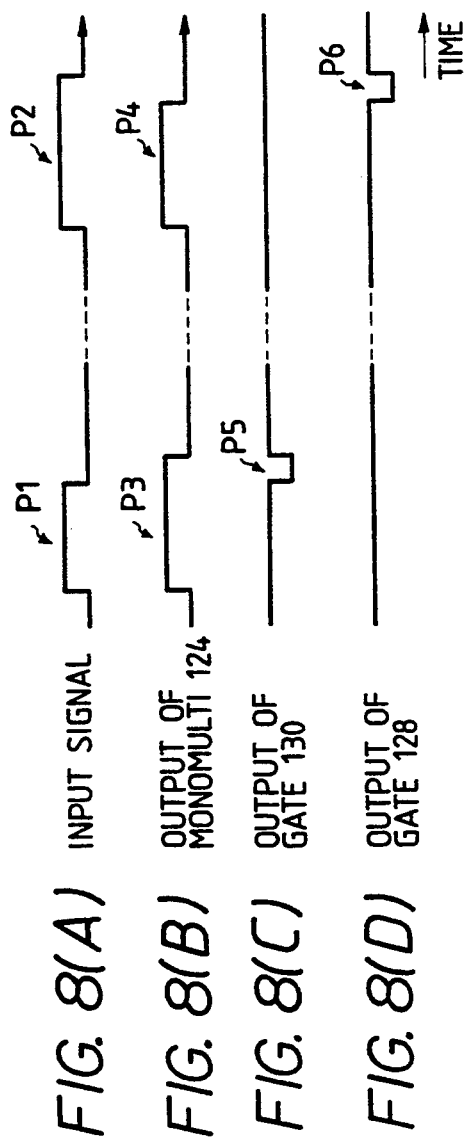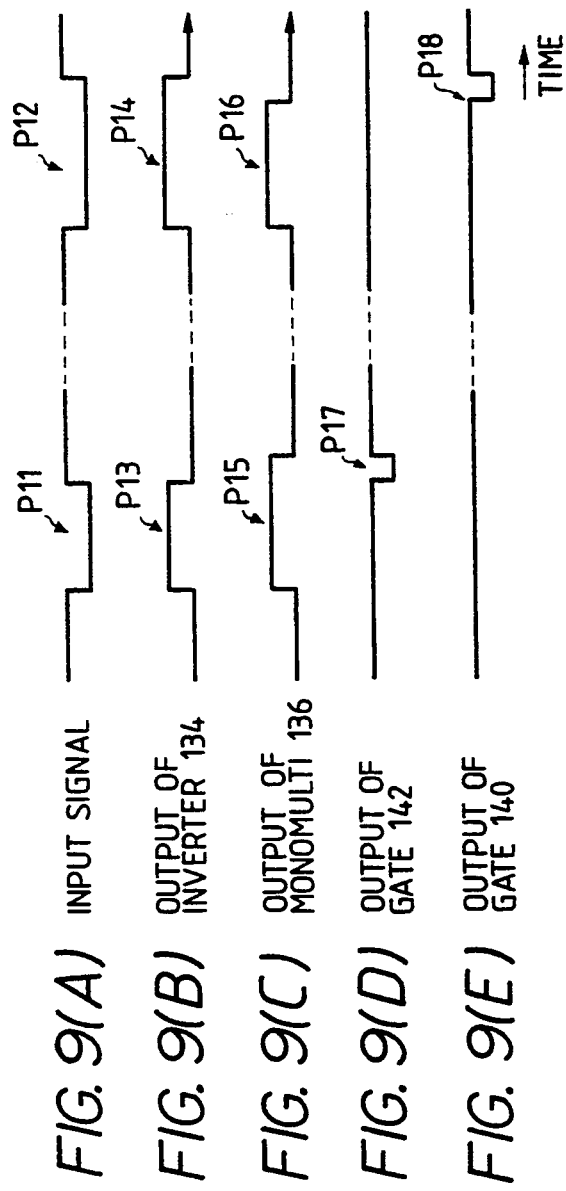

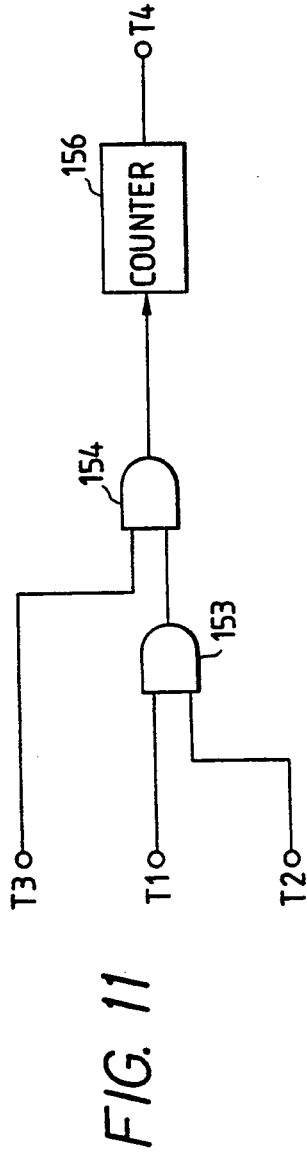
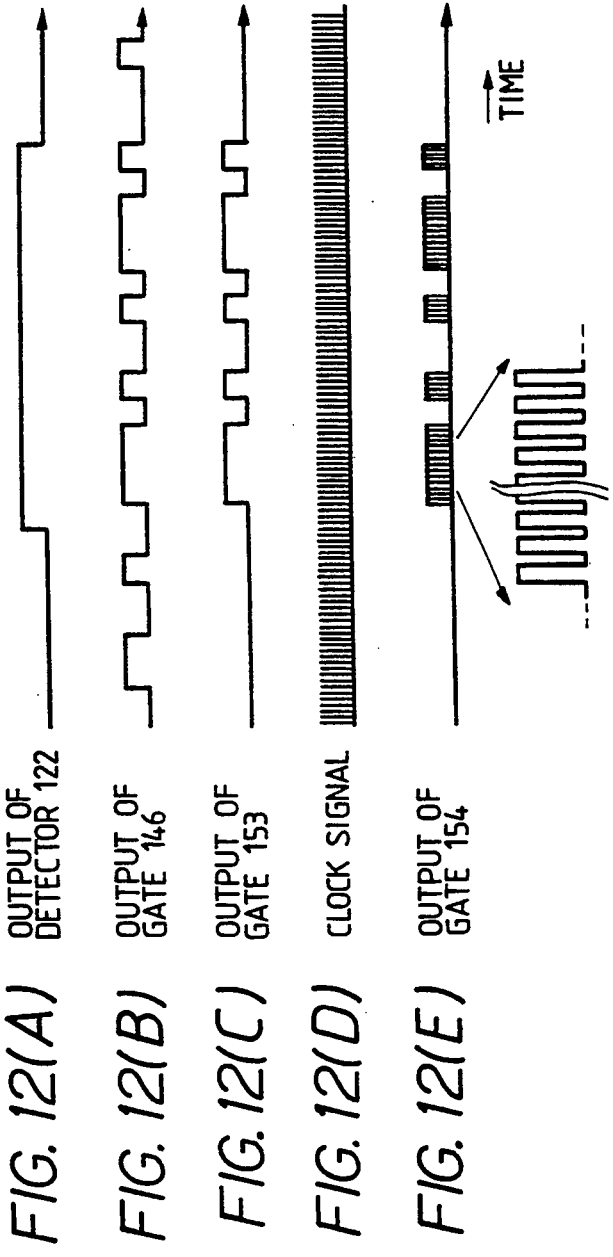
FIG. 11
FIG. 12(A) OUTPUT OF DETECTOR 122
FIG. 12(B) OUTPUT OF GATE 146
FIG. 12(C) OUTPUT OF GATE 153
FIG. 12(D) CLOCK SIGNAL
FIG. 12(E) OUTPUT OF GATE 154

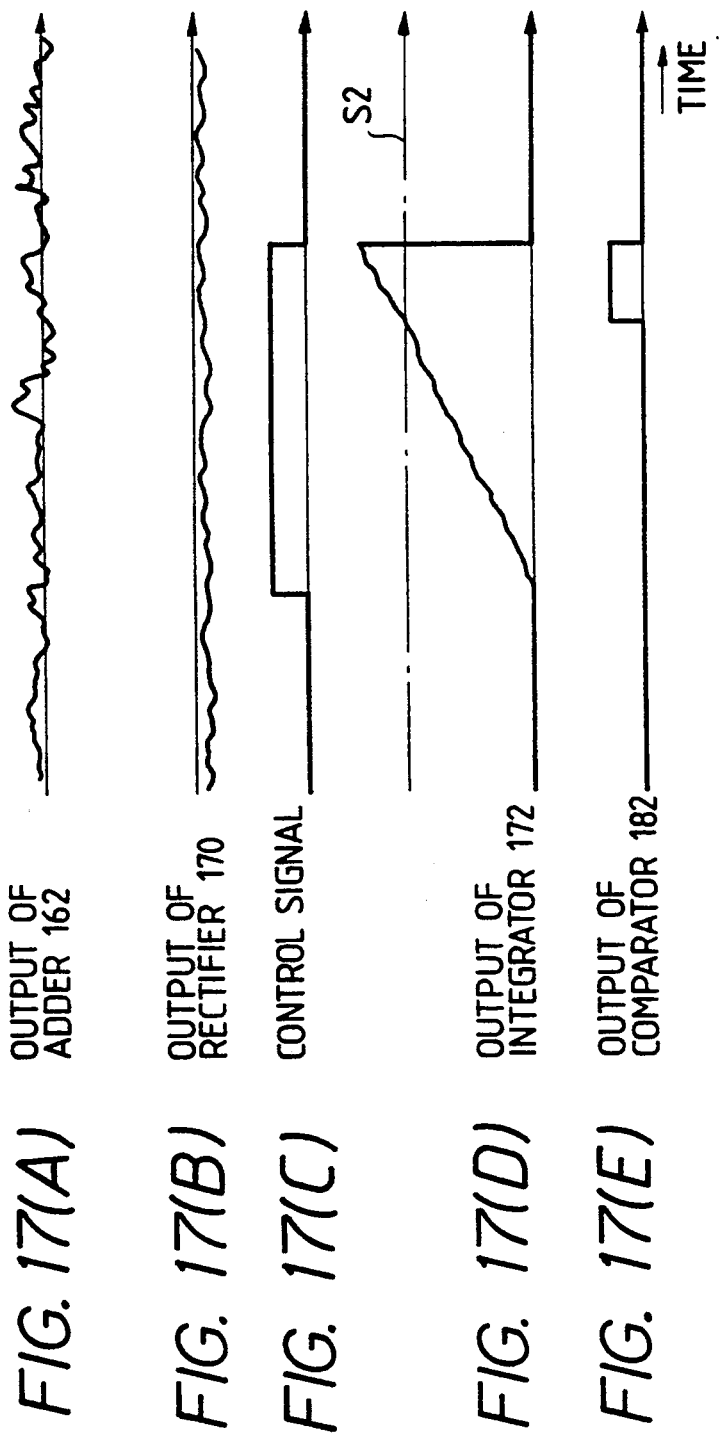

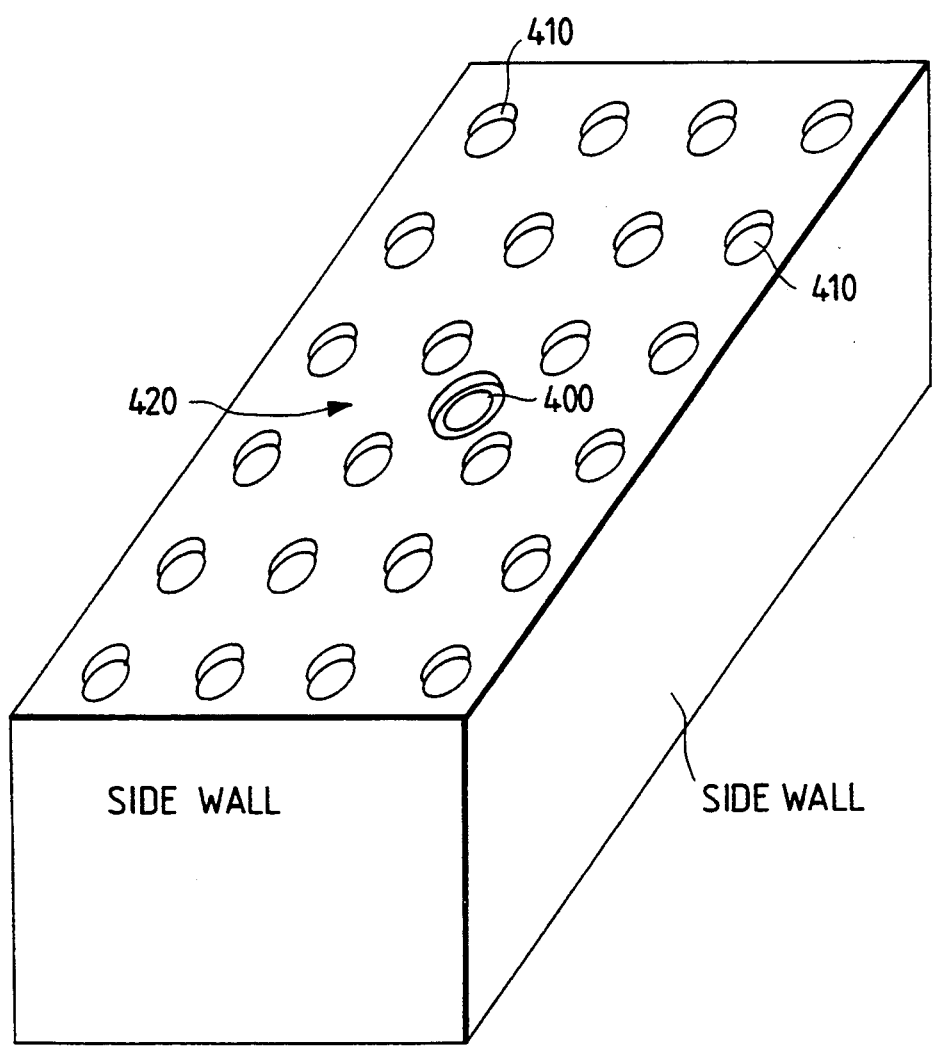

OPTICAL RADIO REPEATER WITH SIGNAL QUALITY DETECTION

This application is a continuation of application Ser. No. 07/744,097 filed Aug. 13, 1991, now abandoned.

BACKGROUND OF THE INVENTION

This invention relates to an optical radio system for the communication between host and end devices.

A known optical radio communication network includes a transmitter, receivers, and repeaters. In the case where a direct optical path between the transmitter and a receiver is blocked, a repeater generally serves to maintain optical radio communication between the transmitter and the receiver. A repeater, which merely amplifies a received optical signal and then outputs a corresponding stronger optical signal, tends to oscillate since a feedback loop is easily formed between receiving and transmitting sections of the repeater. To prevent such an oscillation problem, an optical signal outputted from a transmitter is made into a time-division packet format so that optical signals inputted into and outputted from a repeater can be different from each other in contents. According to time-division packet communication, real-time transmission of information tends to be difficult.

SUMMARY OF THE INVENTION

It is an object of this invention to provide an improved optical radio system..

A first aspect of this invention provides an optical radio system comprising a host device, an end device, and a repeater, wherein the host device and the end device communicate with each other via the repeater by use of optical radio; wherein the repeater comprises means for receiving a first light signal from one of the host device and the end device, means for converting the received first light signal into a first electric signal, means for frequency-converting the first electric signal into a second electric signal, and means for generating a second light signal in response to the second electric signal and transmitting the generated second light signal; and wherein the repeater comprises means for demodulating one of the first electric signal and the second electric signal into a baseband signal, means for detecting a quality of the baseband signal, and means for enabling transmission of the second light signal only when the detected quality of the baseband signal is equal to or greater than a predetermined quality.

A second aspect of this invention provides a repeater for an optical radio communication network, comprising means for receiving a first light signal, and converting the first light signal into a first electric signal; means for generating a second electric signal in response to the first electric signal; transmitting means for converting the second electric signal into a second light signal, and transmitting the second light signal; means for detecting a condition of one of the first electric signal and the second electric signal; and means for selectively enabling and disabling the transmitting means in response to the detected condition of one of the first electric signal and the second electric signal.

BRIEF DESCRIPTION OF THE DRAWINGS

FIG. 5 is a time-domain diagram of a signal.

FIGS. 8, 9, and 10 are time-domain diagrams showing the waveforms of various signals in the jitter detector of FIG. 7.

FIG. 11 is a block diagram of a signal quality detector according to a third embodiment of this invention.

FIG. 12 is a time-domain diagram showing the waveforms of various signals in the signal quality detector of FIG. 11.

FIG. 17 is a time-domain diagram showing the waveforms of various signals in the noise detector of FIG. 16.

FIG. 27 is a perspective view of a host device, repeaters, and a ceiling.

DESCRIPTION OF THE FIRST PREFERRED EMBODIMENT

Figure 1:
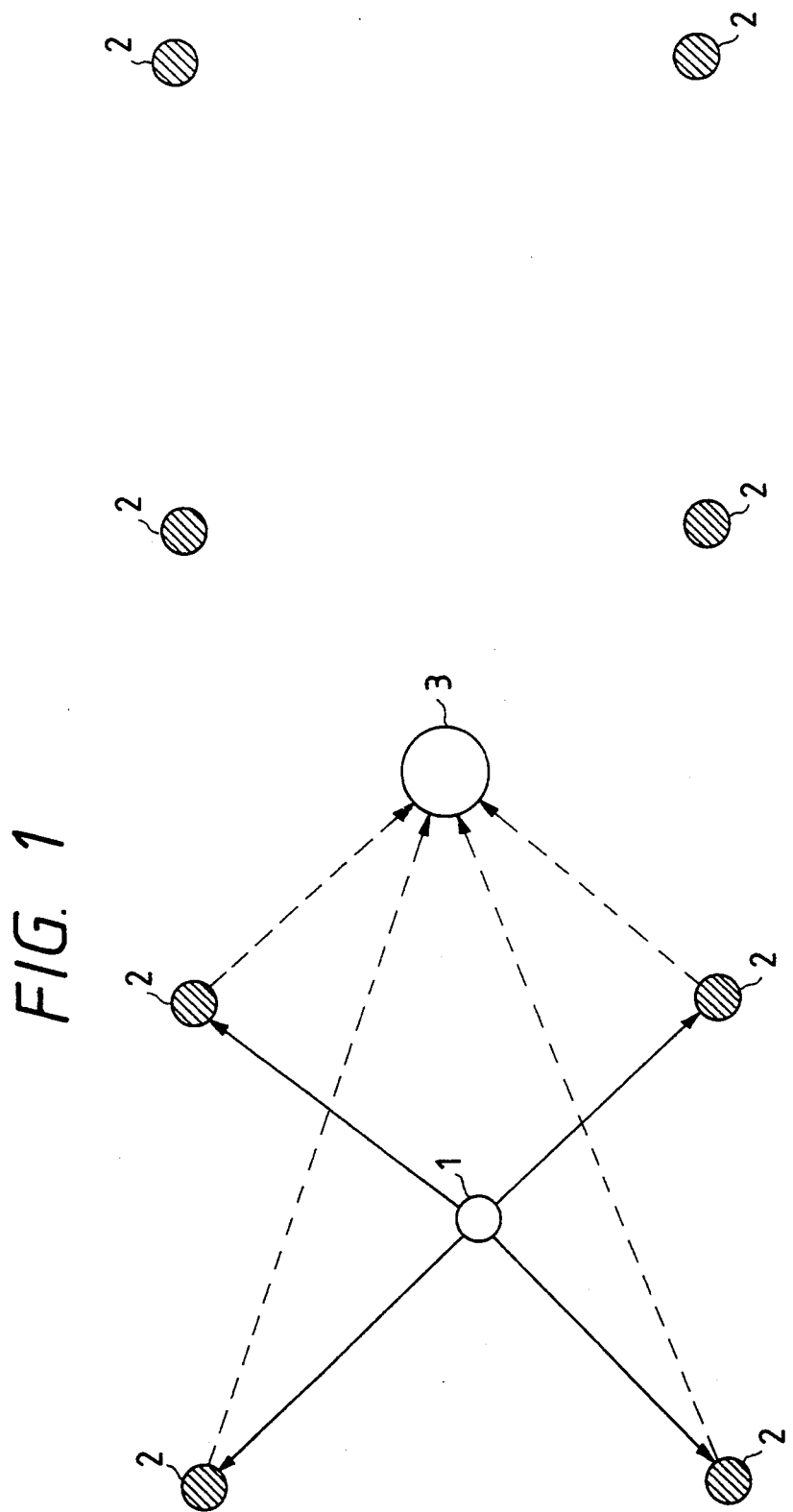
FIGS. 1 and 2 are diagrams of an optical radio communication network according to a first embodiment of this Invention.
Figure 2:
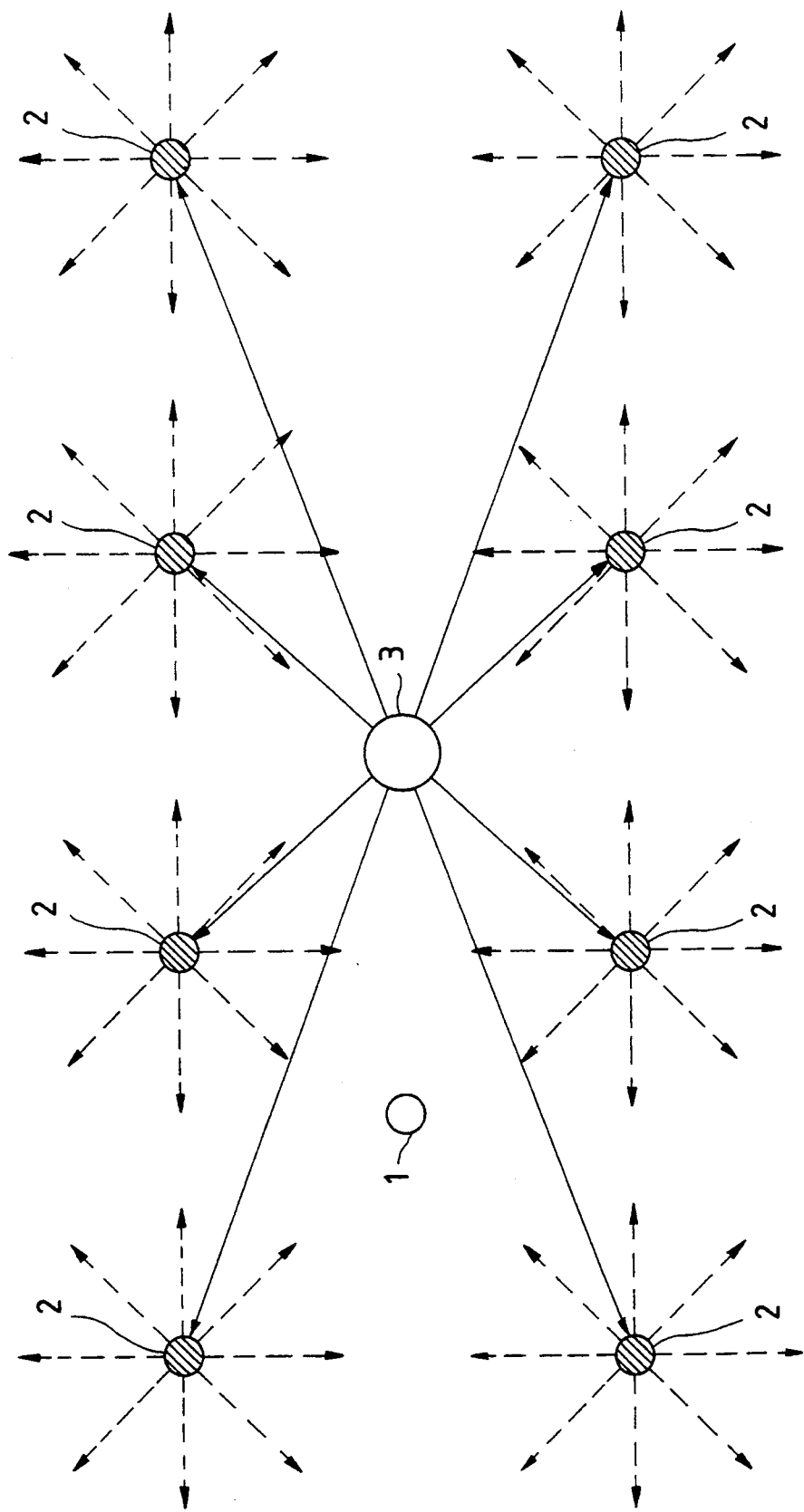

With reference to FIGS. 1 and 2, an optical radio communication network includes end devices 1 and a host device 3. In FIGS. 1 and 2, only one of the end devices 1 is shown. Each of the end devices 1 includes a keyboard terminal device (a computer end terminal) and a pair of optical radio transmitter and receiver. The host device 3 includes a computer main body and a pair of optical radio transmitter and receiver. The host device 3 can communicate with the end devices 1 by optical radio. In general, the end devices 1 and the host device 3 are located in a common room.

Repeaters 2 are regularly arranged in the room. For example, the repeaters 2 are fixed at the ceiling of the room. The repeaters 2 serve to enable and maintain optical radio communication between the host device 3 and the end devices I. A repeater 2 is always used in the communication between an end device 1 and the host device 3 regardless of whether a direct optical path between the end device 1 and the host device 3 is blocked or unblocked.

Uplink is now defined as the transmission of am optical signal from an end device 1 to the host device 3 via a repeater 2. In addition, downlink is defined as the transmission of an optical signal from the host device 3 to an end device 1 via a repeater 2. During both of uplink and downlink, a repeater 2 receives a first optical signal which is periodically made on and off at a frequency of about 2 MHz. In other words, the intensity of the first optical signal is modulated at a frequency of about 2 MHz. Then, the repeater 2 generates a second optical signal on the basis of the received first optical signal, and outputs the second optical signal. The second optical signal is periodically made on and off at a frequency of about 4 MHz. In other words, the intensity of the second optical signal is modulated at a frequency of about 4 MHz.

As shown in FIG. 1, during uplink, some of the repeaters 2 receive a first optical signal from an end device 1, the first optical signal being generated on the basis of an electric signal which results from the modulation of a first carrier with data. The first carrier has a frequency of 2 MHz. Each of the repeaters 2 generates a second optical signal on the basis of the received first optical signal. The second optical signal corresponds to an assumed electric signal which results from the modulation of a second carrier with data. The second carrier has a frequency of 4 MHz. Each of the repeaters 2 transmits the second optical signal to the host device 3.

As shown in FIG. 2, during downlink, the repeaters 2 receive a first optical signal from the host device 3, the first optical signal being generated on the basis of an electric signal which results from the modulation of a first carrier with data. The first carrier has a frequency of 2 MHz. Each of the repeaters 2 generates a second optical signal on the basis of the received first optical signal. The second optical signal corresponds to an assumed electric signal which results from the modulation of a second carrier with data. The second carrier has a frequency of 4 MHz. The repeaters 2 transmit the second optical signals to the end devices 1.

During both of uplink and downlink, In each repeater 2, the second 4-MHz carrier is generated from the first 2-MHz carrier by a frequency doubling process. Since the on/off frequencies of optical signals Inputted Into and outputted from a repeater 2 are different, the repeater 2 is prevented from oscillating.

During uplink, a transmitter of an end device 1 converts transmission data into a first optical signal and transmits the first optical signal. Specifically, the transmitter frequency-modulates the electric 2-MHz carrier with the transmission data, and thereby converts the transmission data into an electric 2-MHz-carrier FM signal. Then, the transmitter converts the electric 2-MHz-carrier FM signal into a corresponding first optical signal, and transmits and radiates the first optical signal. Repeaters 2 located within a service area of the transmitter of the present end device 1 receive the first optical signal therefrom. Each of the repeaters 2 converts the received first optical signal into a corresponding electric 2-MHz-carrier FM signal, and then converts the electric 2-MHz-carrier FM signal into an electric 4-MHz-carrier FM signal by a frequency doubling process. Finally, each of the repeaters 2 converts the electric 4-MHz-carrier FM signal into a corresponding second optical signal, rand transmits and radiates the second optical signal. A receiver of the host device 3 receives the second optical signal from each of the repeaters 2. The receiver converts the second optical signal into an electric 4-MHz-carrier FM signal, and demodulates the electric 4-MHz-carrier FM signal to recover the transmission data therefrom.

During downlink, a transmitter of the host device 3 converts transmission data into a first optical signal and transmits the first optical signal. Specifically, the transmitter frequency-modulates the electric 2-MHz carrier with the transmission data, and thereby converts the transmission data into an electric 2-MHz-carrier FM signal. Then, the transmitter converts the electric 2-MHz-carrier FM signal into a corresponding first optical signal, and transmits and radiates the first optical signal. The repeaters 2 receive the first optical signal from the host device 3. Each of the repeaters 2 converts the received first optical signal into a corresponding electric 2-MHz-carrier FM signal, and then converts the electric 2-MHz-carrier FM signal into an electric 4-MHz-carrier FM signal by a frequency doubling process. Finally, each of the repeaters 2 converts the electric 4-MHz-carrier FM signal into a corresponding second optical signal, and transmits and radiates the second optical signal. A receiver of an end device 1 receives the second optical signal from some of the repeaters 3. The receiver converts the second optical signal into an electric 4-MHz-carrier FM signal, and demodulates the electric 4-MHz-carrier FM signal to recover the transmission data therefrom.

During both of uplink and downlink, the host device 3 and the end devices 1 can communicate with each other in real time via the repeaters 2.

Figure 3:
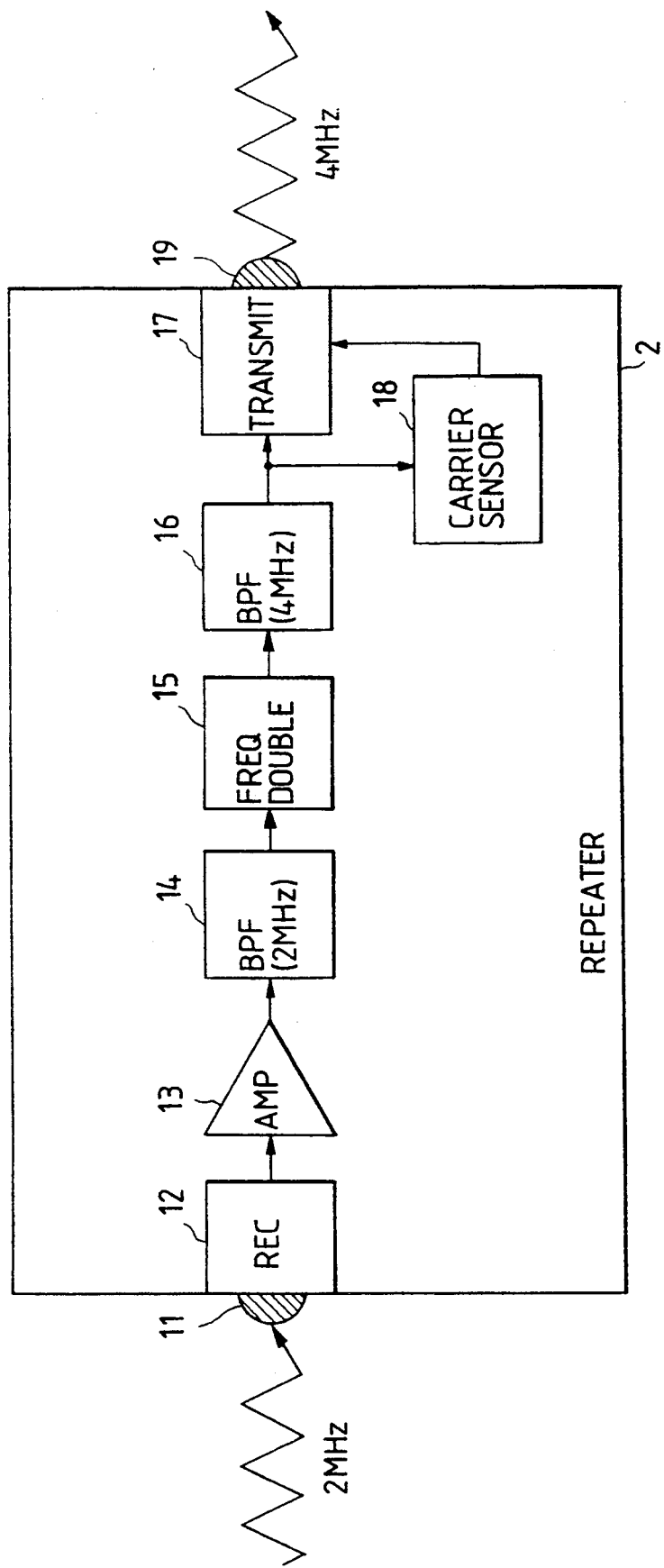
FIG. 3 is a block diagram of a repeater in FIGS. 1 and 2.

As shown in FIG. 3, a repeater 2 includes an exposed light receiving element 11 which detects a first optical signal radiated from the host device 3 or an end device 1. A photo-receiver 12 connected to the light receiving element 11 converts the received first optical signal into a corresponding electric 2-MHz-carrier signal. The electric 2-MHz-carrier signal is amplified by an amplifier 13, being passed through a 2-MHz band pass filter 14 before being fed to a frequency doubler 15. The frequency doubler 15 converts the electric 2-MHz-carrier signal into an electric 4-MHz-carrier signal through a frequency doubling process. The electric 4-MHz-carrier signal is passed through a 4-MHz band pass filter 16 before being fed to a photo-transmitter 17 and a carrier sensor 18. The carrier sensor 18 includes a comparator which compares the RF level (the amplitude) of the electric 4-MHz-carrier signal with a predetermined reference level to decide whether or not the quality of the electric 4-MHz-carrier signal is good. The carrier sensor 18 also includes a signal generator which generates a binary transmission control signal being changeable between "H" and "L" in accordance with whether or not the RF level of the electric 4-MHz-carrier signal exceeds the reference level, that is, whether or not the quality of the electric 4-MHz-carrier signal is good. One of the "H" transmission control signal and the "L" transmission control signal is defined as a transmission permitting signal corresponding to the fact that the RF level of the electric 4-MHz-carrier signal exceeds the reference level, that is, the fact that the quality of the electric 4-MHz-carrier signal is good. The other of the "H" transmission control signal and the "L" transmission control signal is defined as a transmission inhibiting signal corresponding to the fact that the RF level of the electric 4-MHz-carrier signal does not exceed the reference level, that is, the fact that the quality of the electric 4-MHz-carrier signal is not good. The carrier sensor 18 outputs the transmission control signal to the photo-transmitter 17. When the photo-transmitter 17 receives the permitting-state transmission control signal from the carrier sensor 18, the photo-transmitter 17 drives an exposed light emitting element 19 in response to the electric 4-MHz-carrier signal so that the electric 4-MHz-carrier slgnal will be converted into a corresponding second optical signal with an on/off frequency of about 4 MHz. The second optical signal is radiated from the light emitting element 19. When the photo-transmitter 17 receives the inhibiting-state transmission control signal from the carrier sensor 18, the photo-transmitter 17 does not drive the light emitting element 19 so that a second optical signal will not be radiated from the light emitting element 19.

Thus, the repeater 2 series to convert the received optical 2-MHz-on/off signal into a corresponding optical 4-MHz-on/off signal and to transmit the optical 4-MHz-on/off signal. The repeater 2 also has an amplifying function which enables an adequate intensity of the transmitted optical 4-MHz-on/off signal. Since the on/off frequencies of the optical signals inputted into and outputted from the repeater 2 are different, a feedback loop is prevented from occurring between the receiving and transmitting sections of the repeater 2. Thus, the repeater 2 is prevented from oscillating.

In a network having a plurality of repeaters, the frequency doubling process in each of the repeaters produces the following good advantage. In the case of communication between a host device and an end device via multi-paths including different repeaters, the frequency-doubling processes in the repeaters ensure that the on/off frequencies of second optical signals received by the host device or the end device can be exactly equal to each other. This frequency equality prevents adverse interference between the second optical signals, and specifically prevents mutual cancellation of the second optical signals.

Figure 4:
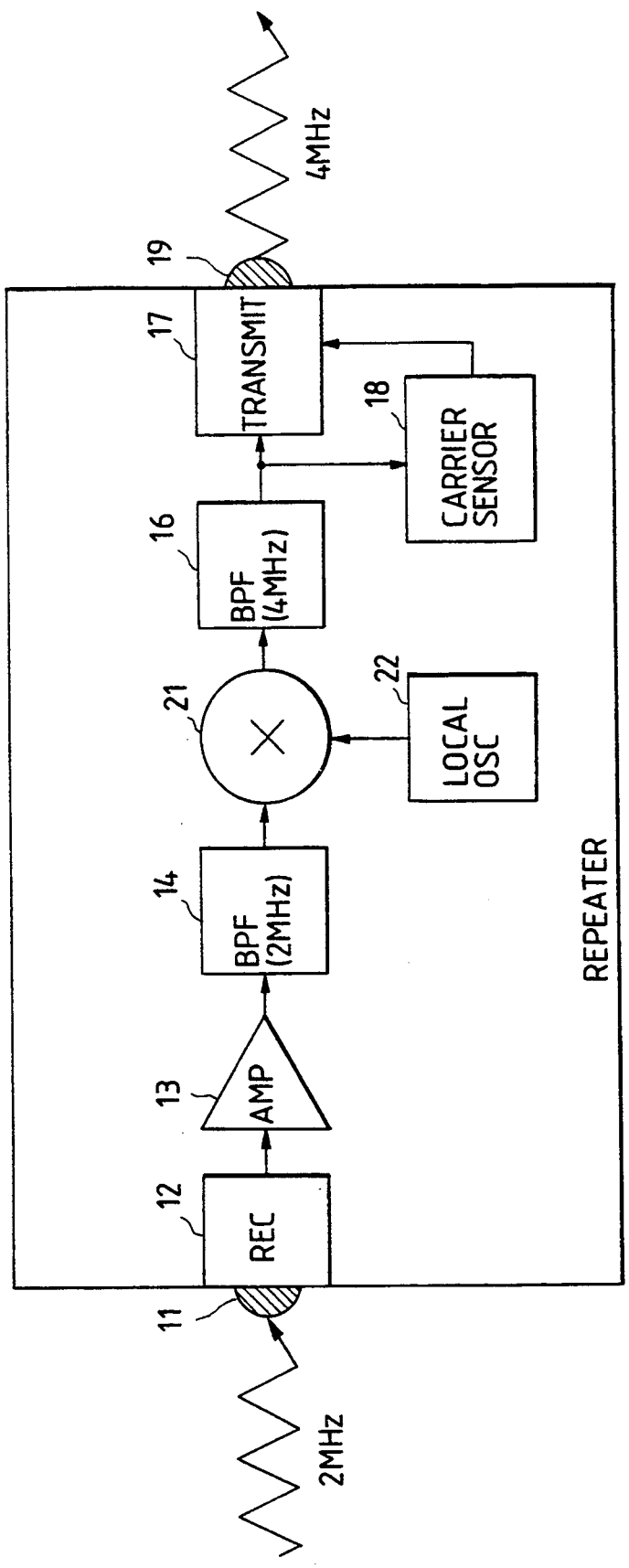
FIG. 4 is a block diagram of a modified repeater.

As shown in FIG. 4, the frequency doubler 15 may be replaced by a combination of a mixer 21 and a local oscillator 22. The mixer 21 receives the electric 2-MHz-carrier signal from the band pass filter 14. The mixer 21 also receives an electric 2-MHz carrier from the local oscillator 22. The mixer 21 mixes the electric 2-MHz-carrier signal and the electric 2-MHz carrier, executing up-conversion of the electric 2-MHz-carrier signal into an electric 4-MHz-carrier signal. The mixer 21 outputs the electric 4-MHz-carrier signal to the band pass filter 16.

It should be noted that the carrier sensor 18 may be moved so as to directly follow the photo-receiver 12, the amplifier 13, or the band pass filter 14. In this case, the carrier sensor 18 operates on the first electric signal rather than the second electric signal.

DESCRIPTION OF THE SECOND PREFERRED EMBODIMENT

Figure 6:
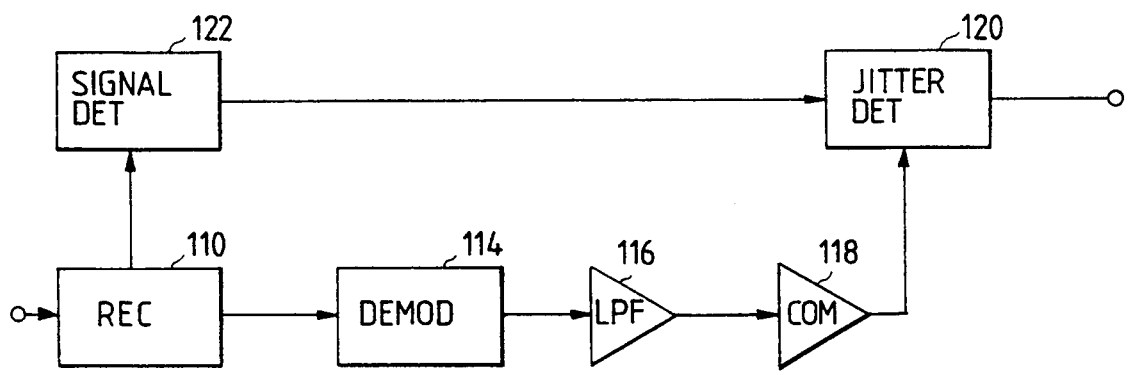
FIG. 6 is a block diagram of a signal quality detector according to a second embodiment of this invention.

A second embodiment of this invention is similar to the embodiment of FIGS. 1–3 except that the carrier sensor 18 (see FIG. 3) is replaced by a signal quality detector, and that, as shown in FIG. 5, a preamble including a sequence of "H" and "L" ("1" and "0") precedes data in a first optical signal. FIG. 6 shows the signal quality detector in the second embodiment.

As shown in FIG. 6, the signal quality detector includes an RF receiving section 110 which is followed by a demodulator 114 and a signal detector 122. The RF receiving section 110 receives the output signal from the band pass filter 16 (see FIG. 3), and transmits the received signal to the demodulator 114 and the signal detector 122. The demodulator 114 demodulates the output signal from the RF receiving section 110 into a baseband signal including a preamble and data. The output terminal of the demodulator 114 is connected to a first input terminal of a jitter detector 120 via a low pass filter 116 and a comparator 118. The low pass filter 116 separates the baseband signal from high-frequency noise components. The comparator 118 digitizes the baseband signal. The digitized baseband signal is fed to the jitter detector 120.

The output terminal of the signal detector 122 is connected to a second input terminal of the jitter detector 120. The signal detector 122 detects a preamble of the output signal from the RF receiving section 110, and generates a binary signal representing the period of the preamble and outputs the preamble-period signal to the jitter detector 120.

The jitter detector 120 detects a jitter in the digital baseband signal, the jitter being measured with respect to the quantity of a shift of a characteristic time from a 1-bit time length. The characteristic time is equal to an interval between the moments of occurrence of an upward edge and a following downward edge in the preamble or being equal to an interval between the moments of occurrence of a downward edge and a following upward edge in the preamble.

Figure 7:
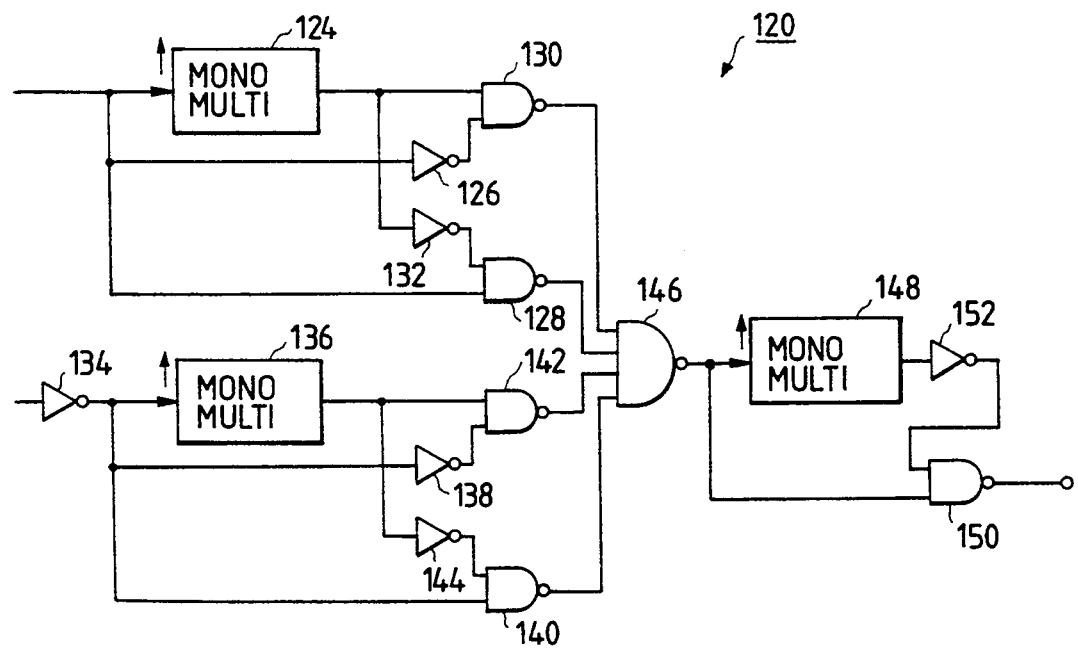
FIG. 7 is a block diagram of a jitter detector of FIG. 6.

As shown in FIG. 7, the jitter detector 120 includes a monostable multivibrator 124, an inverter 126, and a NAND gate 128. The monostable multivibrator 124 and the inverter 126 receive the digital baseband signal from the comparator 118 (see FIG. 6). In addition, a first input terminal of the NAND gate 128 is subjected to the digital baseband signal. The output terminal of the monostable multivibrator 124 is connected to a first input terminal of a NAND gate 130 and the input terminal of an inverter 132. The output terminal of the inverter 126 is connected to a second input terminal of the NAND gate 130. The output terminal of the inverter 132 is connected to a second input terminal of the NAND gate 128. This part of the jitter detector 120 detects a jitter quantity with respect to a downward edge in the preamble.

The jitter detector 120 also includes inverters 134 and 138, a monostable multivibrator 136, and a NAND gate 140. The inverter 134 receives the digital baseband signal from the comparator 118 (see FIG. 6). The output terminal of the inverter 134 is connected to the input terminal of the multivibrator 136, the input terminal of the inverter 138, and a first input terminal of the NAND gate 140. The output terminal of the monostable multivibrator 136 is connected to a first input terminal of a NAND gate 142 and the input terminal of an inverter 144. The output terminal of the inverter 138 is connected to a second input terminal of the NAND gate 142. The output terminal of the inverter 144 is connected to a second input terminal of the NAND gate 140. This part of the jitter detector 120 detects a jitter quantity with respect to an upward edge in the preamble.

The output terminals of the NAND gates 128, 130, 140, and 142 are connected to input terminals of a NAND gate 146 respectively. The output terminal of the NAND gate 146 is connected to the input terminal of a monostable multivibrator 148 and a first input terminal of a NAND gate 150. The output terminal of the monostable multivibrator 148 is connected to a second input terminal of the NAND gate 150 via an inverter 152. This part of the jitter detector 120 decides whether or not the detected jitter quantities are smaller than predetermined reference quantities.

It is now assumed that, as shown in the part (A) of FIG. 8, the input signal (the digitized baseband signal) contains a shorter positive pulse P1 and a longer positive pulse P2 during a preamble period. The monostable multivibrator 124 outputs positive pulses P3 and P4 of a correct 1-bit length in response to the pulses P1 and P2 respectively (see the part (B) of FIG. 8). As shown in the parts (A) and (B) of FIG. 8, the downward edge of the shorter pulse P1 advances from the downward edge of the corresponding correct 1-bit-length pulse P3. On the other hand, the downward edge of the longer pulse P2 retards from the downward edge of the corresponding correct 1-bit-length pulse P4.

The pulse P1 is inverted by the inverter 126, and the inversion of the pulse P1 is inputted into the NAND gate 130. The pulse P3 is directly inputted into the NAND gate 130. The NAND gate 130 outputs a negative pulse P5 in response to the pulse P3 and the inversion of the pulse P1 (see the part (C) of FIG. 8). The pulse P5 has a width which is proportional to the quantity of the advance of the downward edge of the shorter pulse P1 relative to the downward edge of the correct 1-bit-length pulse P3. It should be noted that the NAND gate 128 does not output any pulse in response to the pulses P1 and P3 (see the part (D) of FIG. 8).

The pulse P4 is inverted by the inverter 132, and the inversion of the pulse P4 is inputted into the NAND gate 128. The pulse P2 is directly inputted into the NAND gate 128. The NAND gate 128 outputs a negative pulse P6 in response to the pulse P2 and the inversion of the pulse P4 (see the part (D) of FIG. 8). The pulse P6 has a width which is proportional to the quantity of the retardation of the downward edge of the longer pulse P2 relative to the downward edge of the correct 1-bit-length pulse P4. It should be noted that the NAND gate 130 does not output any pulse in response to the pulses P2 and P4 (see the part (C) of FIG. 8).

It is now assumed that, as shown in the part (A) of FIG. 9, the input signal (the digitized baseband signal) contains a shorter negative pulse P11 and a longer negative pulse P12 during a preamble period. The shorter negative pulse P11 and the longer negative pulse P12 are converted by the inverter 134 into corresponding shorter positive pulse P13 and longer positive pulse P14 respectively (see the part (B) of FIG. 9). The monostable multivibrator 136 outputs positive pulses P15 and P16 of a correct 1-bit length in response to the pulses P13 and P14 respectively (see the part (C) of FIG. 9). As shown in the parts (B) and (C) of FIG. 9, the downward edge of the shorter pulse P13 advances from the downward edge of the corresponding correct 1-bit-length pulse P15. On the other hand, the downward edge of the longer pulse P14 retards from the downward edge of the corresponding correct 1-bit-length pulse P16.

The pulse P13 is inverted by the inverter 138, and the inversion of the pulse P13 is inputted into the NAND gate 142. The pulse P15 is directly inputted into the NAND gate 142. The NAND gate 142 outputs a negative pulse P17 in response to the pulse P15 and the inversion of the pulse P13 (see the part (D) of FIG. 9). The pulse P17 has a width which is proportional to the quantity of the advance of the downward edge of the shorter pulse P13 relative to the downward edge of the correct 1-bit-length pulse P15. It should be noted that the NAND gate 140 does not output any pulse in response to the pulses P13 and P15 (see the part (E) of FIG. 9).

The pulse P16 is inverted by the inverter 144, and the inversion of the pulse P16 is inputted into the NAND gate 140. The pulse P14 is directly inputted into the NAND gate 140. The NAND gate 140 outputs a negative pulse P18 in response to the pulse P14 and the inversion of the pulse P16 (see the part (E) of FIG. 9). The pulse P18 has a width which is proportional to the quantity of the retardation of the downward edge of the longer pulse P14 relative to the downward edge of the correct 1-bit-length pulse P16. It should be noted that the NAND gate 142 does not output any pulse in response to the pulses P14 and P16 (see the part (D) of FIG. 9).

The output signals from the NAND gates 128, 130, 140, and 142 are inputted into the NAND gate 146, and are combined by the NAND gate 146 into a signal which has, for example, a waveform with a positive shorter pulse P21 and a negative longer pulse P22 as shown in the part (A) of FIG. 10. The output signal from the NAND gate 146 is fed to the monostable multivibrator 148 and the NAND gate 150. The monostable multivibrator 148 outputs positive pulses P23 and P24 in response to the input pulses P21 and P22 respectively (see the part (B) of FIG. 10). The pulses P23 and P24 represent a predetermined jitter threshold quantity. As described previously, the widths of output pulses from the NAND gates 128, 130, 140, and 142 are proportional to the detected jitter quantifies respectively. Thus, the width of an output pulse of the NAND gate 146 corresponds to the detected jitter quantity of the whole of the input slgnal (the digitized baseband signal). The output pulse from the NAND gate 146 is compared with the output threshold pulse from the monostable multivibrator 148 as will be explained later.

The output positive pulses P23 and P24 from the monostable multivibrator 148 are converted by the inverter 152 into corresponding negative pulses P25 and P26 respectively (see the part (C) of FIG. 10). The negative pulses P25 and P26 are fed to the NAND gate 150. The output pulses P21 and P22 from the NAND gate 146 are directly fed to the NAND gate 150. As understood from the previous description, the pulses P25 and P26 represent the jitter threshold quantity while the pulses P21 and P22 represent the detected jitter quantities. The NAND gate 150 compares the detected jitter quantities with the jitter threshold quantity in response to the pulses P21 and P22 and the pulses P25 and P26.

In the case where the width of the detected jitter pulse P21 is shorter than the threshold jitter pulse P25 as shown in FIG. 10, the detected jitter quantity is decided to be acceptable and the NAND gate 150 does not output any pulse (see the part (D) of FIG. 10). In the case where the width of the detected jitter pulse P22 is longer than the threshold jitter pulse P26 as shown in FIG. 10, the detected jitter quantity is decided to be unacceptable and the NAND gate 150 outputs a negative pulse P27 with a width which corresponds to the degree of the unacceptability of the detected jitter quantity (see the part (D) of FIG. 10). A suitable device such as a latch or a flip-flop converts the unacceptable-jitter detection pulse P27 into a binary transmission control signal which is fed to the photo-transmitter 17 (see FIG. 3).

The signal detector 122 includes a comparator which compares the level of the output signal from the RF receiving section 110 with a predetermined reference level to detect whether or not an effective signal is currently received. The signal detector 122 also includes a signal generator which outputs a binary control signal in response to the output signal from the comparator. The control signal remains "H" during the period of the preamble in received signal. The control signal is "L" during other periods. The signal detector 122 outputs the control signal to the jitter detector 120. The jitter detector 120 includes a suitable device, which selectively enables and disables the previously-mentioned jitter detecting section of the jitter detector 120 in response to the control signal fed from the signal detector 122. Specifically, the jitter detecting section of the jitter detector 120 is enabled when the control signal assumes "H". The jitter detecting section of the jitter detector 120 is disabled otherwise. Thus, the jitter detecting section of the jitter detector 120 remains enabled only during the period of the preamble of the received signal.

It should be noted that the RF receiving section 110 may be moved so as to directly follow the photo-receiver 12, the amplifier 13, or the band pass filter 14 of FIG. 3. In this case, the signal quality detector of FIG. 6 operates on the first electric signal rather than the second electric signal.

DESCRIPTION OF THE THIRD PREFERRED EMBODIMENT

FIG. 11 shows a portion of a third embodiment of this invention which is similar to the embodiment of FIG. 6 except for design changes indicated hereinafter.

With reference to FIG. 11, a terminal T1 is connected to the output terminal of the signal detector 122 of FIG. 6. A terminal T2 is connected to the output terminal of the NAND gate 146 of FIG. 7. The terminals T1 and T2 lead to input terminals of an AND gate 153 respectively. The output terminal of the AND gate 153 is connected to a first input terminal of an AND gate 154. A clock pulse signal outputted from a clock pulse generator (not shown) is fed to a second input terminal of the AND gate 154 via a terminal T3. The output terminal of the AND gate 154 is connected to the input terminal of a counter 156. The counter 156 outputs a flag signal representing the detected quality of the received signal. The flag signal is transmitted via a terminal T4 to a suitable device (not shown), being converted into a transmission control signal.

As shown in the part (A) of FIG. 12, the output signal from the signal detector 122 of FIG. 6 has a window waveform representing the preamble period. As shown in the part (B) of FIG. 12, the output signal from the NAND gate 146 of FIG. 7 contains pulses corresponding to the detected jitter quantities. Only during the preamble period, the AND gate 153 remains opened by the output signal from the signal detector 122 of FIG. 6 and the AND gate 153 conducts the output signal from the NAND gate 146 of FIG. 7. Therefore, as shown in the part (C) of FIG. 12, the output signal from the AND gate 153 contains jitter detection pulses only during the preamble period. The clock pulse signal fed to the AND gate 154 contains a train of clock pulses and has a waveform such as shown in the part (D) of FIG. 12. The AND gate 154 executes an AND operation between the clock pulse signal and the output signal from the AND gate 153, so that the output signal from the AND gate 154 has a waveform such as shown in the part (E) of FIG. 12. Specifically, the AND gate 154 conducts the clock pulses only during periods corresponding to the jitter detection pulses.

The counter 156 counts the clock pulses fed from the the AND gate 154. When the number of the counted clock pulses reaches a predetermined number, the counter 156 outputs a flag signal representing that the detected quality of the received signal is unacceptable. Specifically, the number of the clock pulses passed to the counter 156 through the AND gate 154 corresponds to the widths of the jitter detection pulses which represent the detected jitter quantities. The clock pulses are counted by the counter 156, and the degree of the detected jitter quantities is evaluated on the basis of the number of the counted clock pulses.

In other words, the circuit of FIG. 11 operates to integrate the widths of the jitter detection pulses outputted from the AND gate 146 during the preamble period, and to decide whether or not the quality of the received signal is acceptable by referring to the result of the integration.

DESCRIPTION OF THE FOURTH PREFERRED EMBODIMENT

Figure 13:
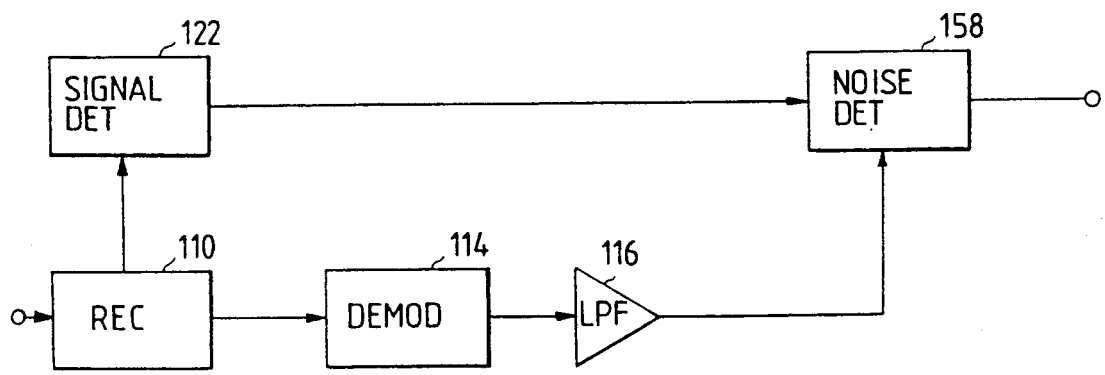
FIG. 13 is a block diagram of a signal quality detector according to a fourth embodiment of this invention.

FIG. 13 shows a portion of a fourth embodiment of this invention which is similar to the embodiment of FIG. 6 except for design changes indicated later.

As shown in FIG. 13, a signal quality detector includes an RF receiving section 110 which is followed by a demodulator 114 and a signal detector 122. The RF receiving section 110 receives the output signal from the band pass filter 16 (see FIG. 3), and transmits the received signal to the demodulator 114 and the signal detector 122. The demodulator 114 demodulates the output signal from the RF receiving section 110 into a baseband signal including a preamble and data. The output terminal of the demodulator 114 is connected to a first input terminal of a noise detector 158 via a low pass filter 116. The low pass filter 116 separates the baseband signal from high-frequency noise components. The baseband signal is fed to the noise detector 158.

The output terminal of the signal detector 122 is connected to a second input terminal of the noise detector 158. The signal detector 122 detects a preamble of the output signal from the RF receiving section 110, and generates a binary signal representing the period of the preamble and outputs the preamble-period signal to the noise detector 158.

Figure 14:
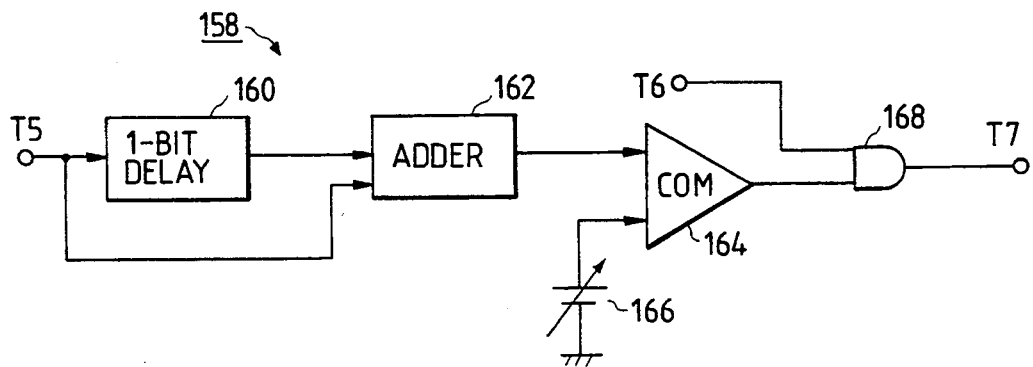
FIG. 14 is a block diagram of a noise detector of FIG. 13.

As shown in FIG. 14, the noise detector 158 includes a 1-bit delay circuit 160 and an adder 162. The output baseband signal from the low pass filter 116 (see FIG. 13) is fed to the input terminal of the 1-bit delay circuit 160 and a first input terminal of the adder 162 via a terminal TS. The output terminal of the 1-bit delay circuit 160 is connected to a second input terminal of the adder 162. The output terminal of the adder 162 is connected to a first input terminal of a comparator 164. A threshold voltage source 166 is connected to a second input terminal of the comparator 164. The output terminal of the comparator 164 is connected to a first input terminal of an AND gate 168. The output signal from the signal detector 122 (see FIG. 13) is fed to a second input terminal of the AND gate 168 via a terminal T6. The output signal from the AND gate 168 is transmitted via a terminal T7.

Figure 15:
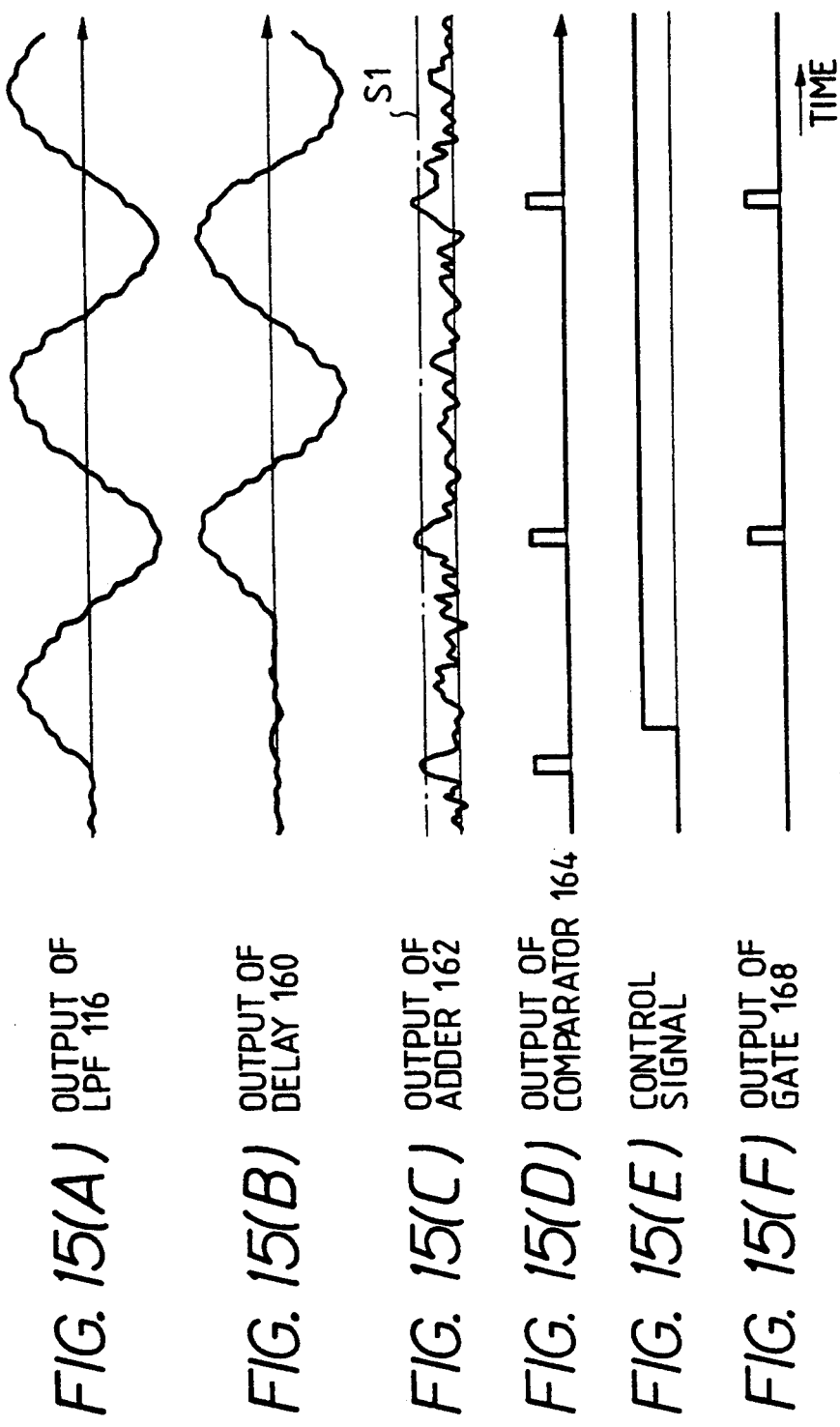
FIG. 15 is a time-domain diagram showing the waveforms of various signals in the noise detector of FIG. 14.

It is now assumed that the output baseband signal from the low pass filter 116 has a waveform of the part (A) of FIG. 15 during the preamble period. Since the baseband signal changes between "H" and "L" at a period of one bit during the preamble interval, the output signal from the 1-bit delay circuit 60 substantially corresponds to the inversion of the output baseband signal from the low pass filter 116 as shown in line part (B) of FIG. 15. The adder 162 adds the baseband signal and the inversion of the baseband signal, cancelling the true signal components and extracting noise components. The output noise-representing signal from the adder 162 has a waveform such as shown in the part (C) of FIG. 15. The comparator 164 compares the level of the output noise-representing signal from the adder 162 with a predetermined threshold voltage S1 (see the part (C) of FIG. 15) fed from the threshold voltage source 166. As shown in the part (D) of FIG. 15, the comparator 164 outputs "H" when the level of the noise-representing signal exceeds the threshold voltage S1, and outputs "L" otherwise. In this way, the comparator 164 outputs noise detection pulses.

The noise detection pulses are fed from the comparator 164 to the AND gate 168. The AND gate 168 receives the control signal from the signal detector 122 which represents the preamble period as shown in the part (E) of FIG. 15. Only during the preamble period, the AND gate 168 remains opened by the output control signal from the signal detector 122, and the AND gate 168 conducts the noise detection pulses as shown in the part (F) of FIG. 15. A suitable device (not shown) generates a binary transmission control signal on the basis of the noise detection pulses passed through the AND gate 168, and feeds the transmission control signal to the photo-transmitter 17 (see FIG. 3). For example, a counter (not shown) counts the noise detection pulses passed through the AND gate 168. A comparator (not shown) compares the number of the counted noise detection pulses with a reference number, generating a binary transmission control signal.

DESCRIPTION OF THE FIFTH PREFERRED EMBODIMENT

Figure 16:
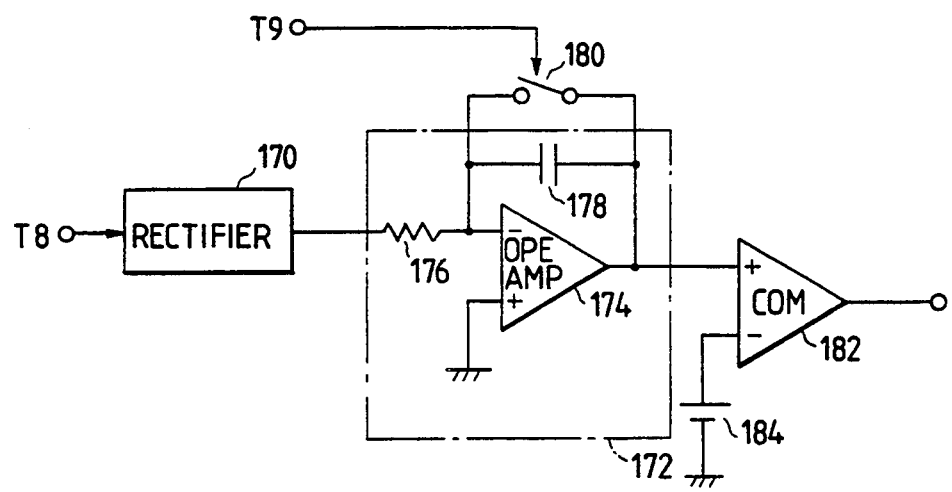
FIG. 16 is a diagram of a noise detector according to a fifth embodiment of this invention.

FIG. 16 shows a portion of a fifth embodiment of this invention which is similar to the embodiment of FIGS. 13 and 14 except for design changes indicated hereinafter.

With reference to FIG. 16, a terminal T8 is connected to the output terminal of the adder 162 of FIG. 14. A terminal T9 is connected to the output terminal of the signal detector 122 of FIG. 13. The terminal T8 leads to the input terminal of a full-wave rectifier 170. The terminal T9 leads to a control terminal of a switch 180. The output terminal of the full-wave rectifier 170 is connected to an integrator 172. The integrator 172 includes a well-known combination of an operational amplifier 174, a resistor 176, and a capacitor 178. The switch 180 is connected in parallel with the capacitor 178. The output terminal of the integrator 172 is connected to a first Input terminal of a comparator 182. A threshold voltage source 184 is connected to a second input terminal of the comparator 182. The comparator 182 outputs a signal representing the detected quality of the received signal.

It is now assumed that the output noise-representing signal from the adder 162 of FIG. 14 has a waveform of the part (A) of FIG. 17. The noise-representing signal is rectified by the full-wave rectifier 170. The output signal from the full-wave rectifier 170 has a waveform of the part (B) of FIG. 17. The output signal from the full-wave rectifier 170 is fed to the Integrator 172. During the preamble period, the control signal fed to the switch 180 from the signal generator 122 of FIG. 13 remains "H" as shown In the part (C) of FIG. 17 so that the switch 180 keeps open. During other periods, the control signal to the switch 180 remains "L" as shown in the part (C) of FIG. 17 so that the switch 180 continues to be closed. Thus, the Integrator 172 starts to integrate the output signal from the full-wave rectifier 170 at the moment of the start of the preamble period, continuing the integration during the preamble period and being reset at the moment of the end of the preamble period. As shown in the part (D) of FIG. 17, the level of the output signal from the integrator 172 gradually rises during the preamble period.

The comparator 182 compares the level of the output signal from the integrator 172 with a predetermined threshold voltage S2 (see the part (D) of FIG. 17) fed from the threshold voltage source 184. As shown in the part (E) of FIG. 17, the comparator 182 outputs "H" when the level of the output signal from the integrator 172 exceeds the threshold voltage S2, and outputs "L" otherwise. Accordingly, in the case where the received signal is much contaminated by noise, the comparator 182 outputs a positive pulse representing that the quality of the received signal is unacceptable. A suitable device (not shown) generates a transmission control signal in response to the output signal from the comparator 182.

DESCRIPTION OF THE SIXTH PREFERRED EMBODIMENT

Figure 18:
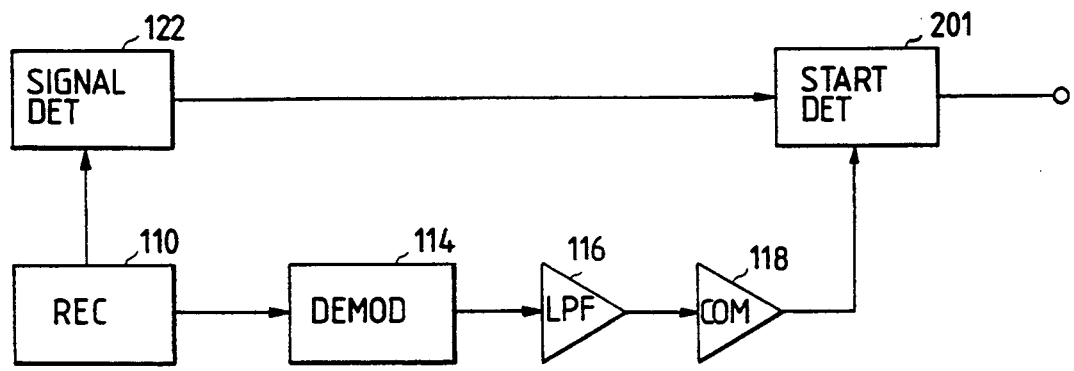
FIG. 18 is a block diagram of a signal pattern detector according to a sixth embodiment of this invention.

A sixth embodiment of this invention is similar to the embodiment of FIGS. 1–3 except that the carrier sensor 18 (see FIG. 3) is replaced by a signal pattern detector, and that a preamble including a predetermined-pattern sequence of "H" and "L" ("1" and "0") precedes data in a first optical signal. FIG. 18 shows the slgnal pattern detector in the sixth embodiment.

As shown in FIG. 18, the signal pattern detector includes an RF receiving section 110 which is followed by a demodulator 114 and a signal detector 122. The RF receiving section 110 receives the output signal from the band pass filter 16 (see FIG. 3), and transmits the received signal to the demodulator 114 and the signal detector 122. The demodulator 114 demodulates the output signal from the RF receiving section 110 into a baseband signal including a preamble and data. The output terminal of the demodulator 114 is connected to a first input terminal of a start detector 201 via a low pass filter 116 and a comparator 118. The low pass filter 116 separates the baseband signal from high-frequency noise components. The comparator 118 digitizes the baseband signal. The digitized baseband signal is fed to the start detector 201.

The output terminal of the signal detector 122 is connected to a second input terminal of the start detector 201. The signal detector 122 detects the presence or absence of the effective output signal from the RF receiving section 110, and generates a control signal representing the result of the detection. Specifically, the control signal assumes "H" when the effective output signal from the RF receiving section 110 is present, and assumes "L" otherwise. The signal detector 122 outputs the control signal to the start detector 201.

When the effective signal is inputted into the RF receiving section 110, the signal detector 122 outputs the "H" control signal to the start detector 201. The start detector 201 is activated in response to the "H" control signal, detecting whether or not a predetermined signal pattern is outputted from the comparator 118. When the start detector 201 detects the predetermined signal pattern, the start detector 201 outputs an "H" transmission permitting signal. The start detector 201 continues to output the "H" transmission permitting signal while the output control signal from the signal detector 122 remains "H". When the effective signal inputted into the RF receiving section 110 ends, the signal detector 122 outputs the "L" control signal to the start detector 201. The start detector 122 outputs an "L" transmission inhibiting signal in response to the "L" control signal. The "H" transmission permitting signal and the "L" transmission inhibiting signal compose a binary transmission control signal which is fed to the photo-transmitter 17 (see FIG. 3).

Figure 19:
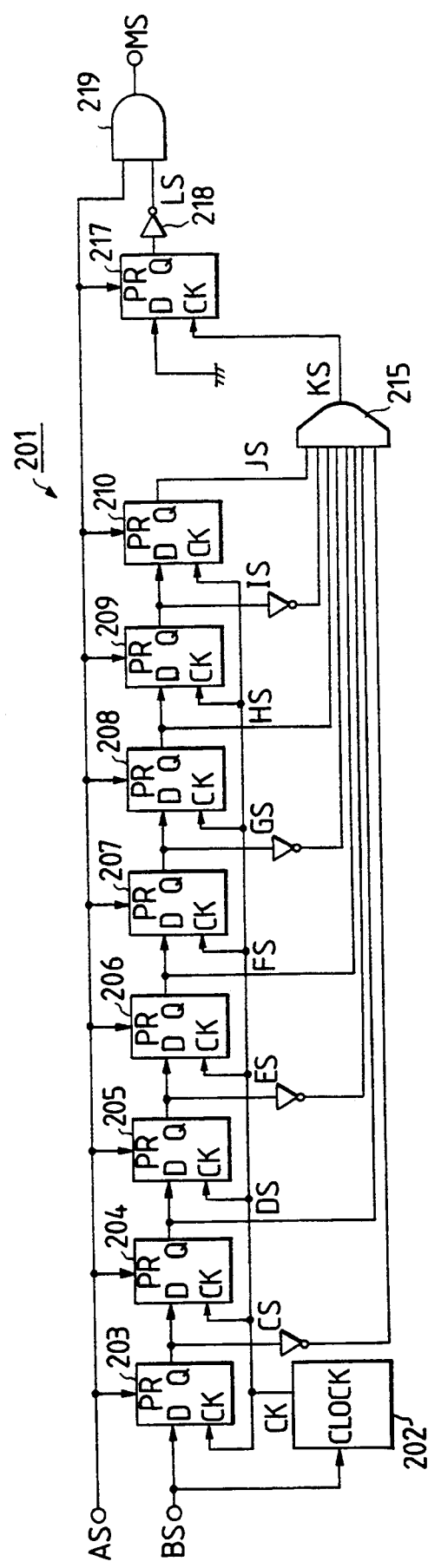
FIG. 19 is a block diagram of a start detector of FIG. 18.

As shown in FIG. 19, the start detector 201 includes a series combination of D-type flip-flops 203–210. The preset terminals of the tip-flops 203–210 are subjected to the output control signal AS from the signal detector 122 of FIG. 18. The clock input terminals of the flip-flops 203–210 receive the clock pulse signal CK from a clock pulse generator 202. The Q output signal from each of the flip-flops 203–210 is fixed to "L" when the voltage at its preset terminal is "L". The Q output signal from each of the flip-flops 203–210 is set to "H" as an initial state when the voltage at its preset terminal changes to "H". Then, each of the flip-flops 203–210 samples a signal at its data input terminal when an upward edge is applied to its clock input terminal. Each of the flip-flops 203–210 holds the sampled signal and outputs it via its Q output terminal.

The digitized output signal BS from the comparator 118 is inputted into the data input terminal of the first flip-flop 203 and the clock pulse generator 202. The clock pulse generator 202 includes a PLL, generating the clock pulse signal CK of a frequency corresponding to the bit rate of the input data. As described previously, the clock pulse signal CK is fed to the clock input terminals of the flop-flops 203–210.

The flip-flop 203 outputs data CS in response to the input signal BS and the clock pulse signal CK. The output data CS from the flip-flop 203 is applied to the data input terminal of the flip-flop 204. The flip-flop 204 outputs data DS which agrees with data resulting from delaying the data CS by a 1-clock period. Similarly, the flip-flops 205–210 output data ES-JS successively delayed by a 1-clock period. The output data CS, ES, GS, and IS from the flip-flops 203, 205, 207, and 209 are transmitted to input terminals of an AND gate 215 via inverters respectively. The output data DS, FS, HS, and JS from the flip-flops 204, 206, 208, and 210 are directly fed to input terminals of the AND gate 215 respectively.

Figure 20:
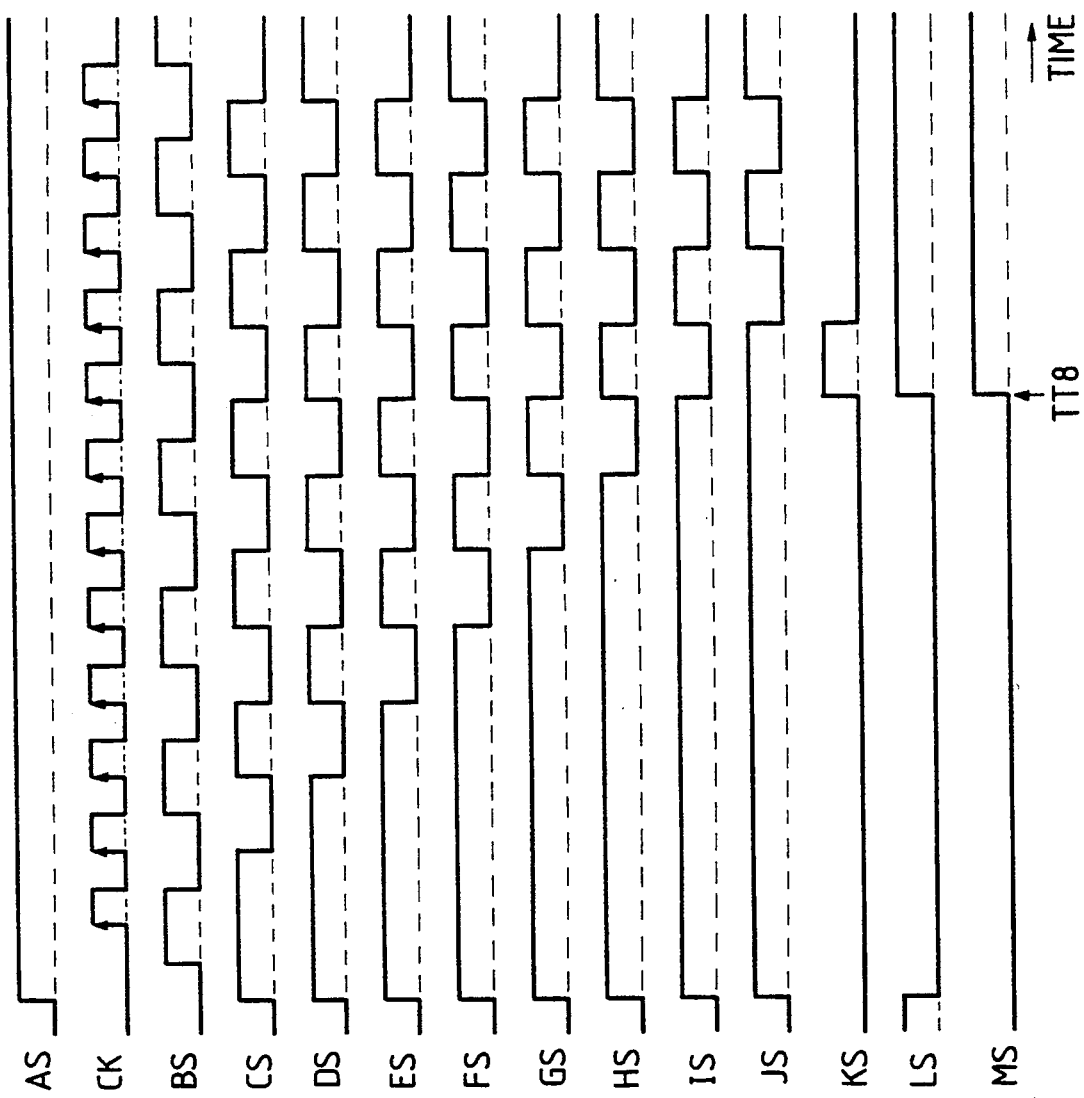
FIG. 20 is a time-domain diagram showing the waveforms of various signals in the start detector of FIG. 19.

In the case where the digitized output signal BS from the comparator 118 regularly and periodically changes between "L" and "H" as shown in FIG. 20, the output data CS, DS, ES, FS, GS, HS, IS, and JS from the flip-flops 203, 204, 205, 206, 207, 208, 209, and 210 are "L", "H", "L", "H", "L", "H", "L", and "H" respectively at a moment TT8 corresponding to the eighth clock pulse as shown in FIG. 20. Generally, at the moment TT8, the output data from the flip-flops 203–210 represent the latest 8 bit serial data in the input signal.

The output data CS, ES, GS, and IS from the tip-flops 203, 205, 207, and 209 are inverted by the inverters, and the output signals from the inverters are fed to the AND gate 215. Thus, under the input signal conditions of FIG. 20, all the input signals to the AND gate 215 assume "H" so that the output signal KS from the AND gate 215 changes from "L" to "H" at the moment TT8 as shown in FIG. 20.

The output terminal of the AND gate 215 is connected to the clock input terminal of a D-type flip-flop 217. The preset terminal of the flip-flop 217 receives the output signal AS from the signal detector 122 of FIG. 18. The output signal from the flip-flop 217 is set to "H" as an initial state in response to the signal AS. The data input terminal of the flip-flop 217 is continuously subjected to "L". When the AND gate 215 outputs an upward edge of the signal KS to the flip-flop 217, the flip-flop 217 samples "L" at its data input terminal so that the output signal from the flip-flop 217 changes from "H" to "L". The output signal from the flip-flop 217 remains "L" until the signal AS fed to its preset terminal returns to "L", that is, until the effective input signal terminates.

The output signal from the flip-flop 217 is converted by an inverter 218 into a signal LS which has a waveform such as shown in FIG. 20. The output signal LS from the inverter 218 is fed to a first input terminal of an AND gate 219. A second input terminal of the AND gate 219 receives the output signal AS from the signal detector 122 of FIG. 18. The AND gate 219 combines the signals AS and LS into a signal MS which has a waveform such as shown in FIG. 20. Under the input signal conditions of FIG. 20, during an interval after the moment TT8, the output signal MS from the AND gate 219 remains "H" until the effective input signal terminates. The output signal MS from the AND gate 219 is used as a transmission control signal fed to the photo-transmitter 17 (see FIG. 3).

Thus, in the case where the predetermined 8-bit signal pattern is detected by the start detector 201, the start detector 201 outputs a transmission permitting signal so that a second optical signal can be outputted from the related repeater.

DESCRIPTION OF THE SEVENTH PREFERRED EMBODIMENT

Figure 21:
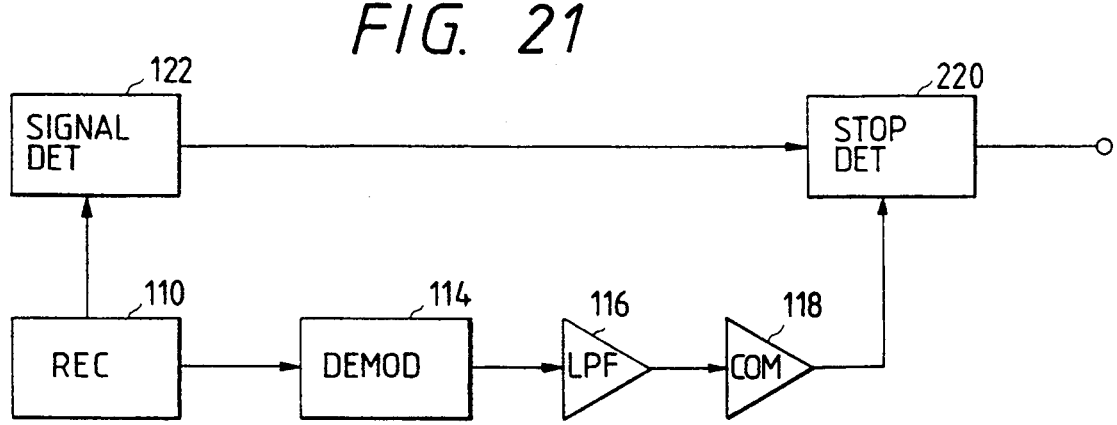
FIG. 21 is a block diagram of a signal pattern detector according to a seventh embodiment of this invention.

A seventh embodiment of this invention is similar to the embodiment of FIGS. 1–3 except that the carrier sensor 18 (see FIG. 3) is replaced by a signal pattern detector, and that a post-able including a sequence of 13 bits of "L" ("0") follows data in a first optical signal. FIG. 21 shows the signal pattern detector in the seventh embodiment.

As shown in FIG. 21, the signal pattern detector includes an RF receiving section 110 which is followed by a demodulator 114 and a signal detector 122. The RF receiving section 110 receives the output signal from the band pass filter 16 (see FIG. 3), and transmits the received signal to the demodulator 114 and the signal detector 122. The demodulator 114 demodulates the output signal from the RF receiving section 110 into a baseband signal including a preamble and data. The output terminal of the demodulator 114 is connected to a first input terminal of a stop detector 220 via a low pass filter 116 and a comparator 118. The low pass filter 116 separates the baseband signal from high-frequency noise components. The comparator 118 digitizes the baseband signal. The digitized baseband signal is fed to the stop detector 220.

The output terminal of the signal detector 122 is connected to a second input terminal of the stop detector 220. The signal detector 122 detects the presence or absence of the effective output signal from the RF receiving section 110, and generates a control signal representing the result of the detection. Specifically, the control signal assumes "H" when the effective output signal from the RF receiving section 110 is present, and assumes "L" otherwise. The signal detector 122 outputs the control signal to the stop detector 220.

When the effective signal is inputted into the RF receiving section 110, the signal detector 122 outputs the "H" control signal to the stop detector 220. The stop detector 220 outputs an "H" transmission permitting signal in response to the "H" control signal. Then, the stop detector 220 detects whether or not a predetermined signal pattern is outputted from the comparator 118. When the stop detector 220 detects the predetermined signal pattern, the stop detector 220 outputs an "L" transmission inhibiting signal. The "H" transmission permitting signal and the "L" transmission inhibiting signal compose a binary transmission control signal which is fed to the photo-transmitter 17 (see FIG. 3).

Figure 22:
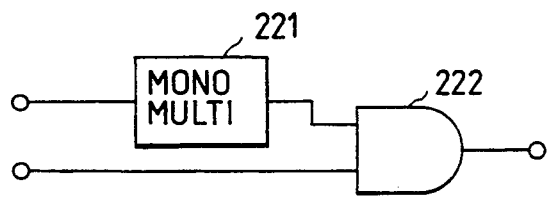
FIG. 22 is a block diagram of a stop detector of FIG. 21.

As shown in FIG. 22, the stop detector 220 includes a monostable multivibrator 221 and an AND gate 222. The input terminal of the multivibrator 221 receives the output signal from the comparator 118 of FIG. 21. The output terminal of the monostable multivibrator 221 is connected to a first input terminal of the AND gate 222. A second input terminal of the find gate 222 receives the output signal from the signal detector 122.

The monostable multivibrator 221 is triggered by an upward edge in the output signal from the comparator 118, outputting a positive pulse having a width corresponding to 13 bits. In the case where data are represented by HDLC codes, during the data period which precedes the post-amble period, the output signal from the monostable multivibrator 221 continues to be "H" due to the characteristics of the HDLC codes. During the post-amble period, the monostable multivibrator 221 receives the sequence of 13 bits of "L" so that the output signal from the monostable multivibrator 221 is reset to "L". The AND gate 222 executes an AND operation between the output signals from the signal detector 122 and the monostable multivibrator 221, generating a transmission control signal in response to the output signals from the signal detector 122 and the monostable multivibrator 221.

DESCRIPTION OF THE EIGHTH PREFERRED EMBODIMENT

An eighth embodiment of this invention relates to a light transmission and reception arrangement used in host and end devices and repeaters in an optical radio communication network.

Figure 23:
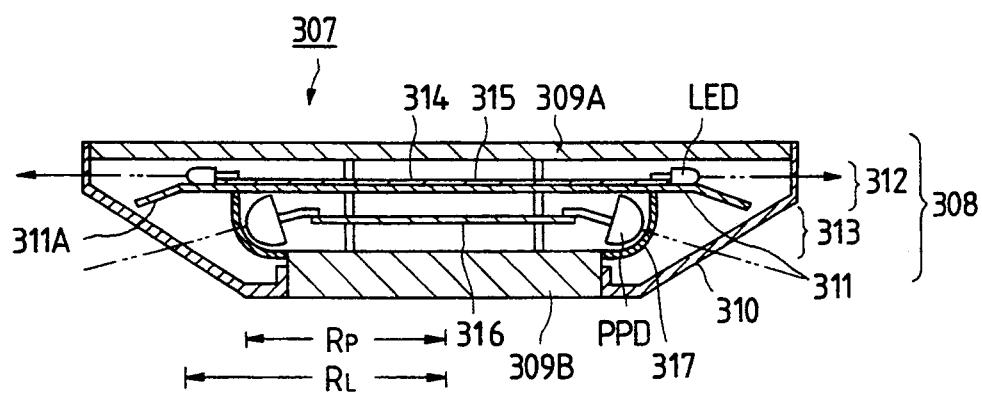
FIG. 23 is a sectional view of a light transmission and reception arrangement according to an eighth embodiment of this invention.

With reference to FIG. 23, the light transmission and reception arrangement has a disc-shaped body 307. The body 307 includes a light transmission/reception section 308, support members 309A and 309B holding the light transmission/reception section 308, a dust cover 310 covering the light transmission/reception section 308, and a signal processor and a power supply (not shown). The light transmission/reception section 308 includes a light transmission unit 312 and a light reception unit 313 which are located at opposite sides of a light shielding plate 311 respectively.

Figure 24:
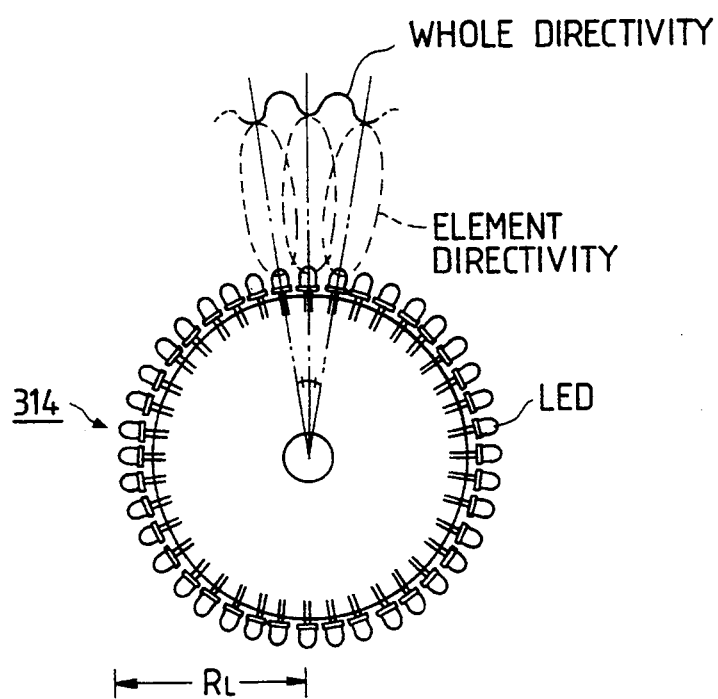
FIG. 24 is a plan view of the light emitting diodes in the embodiment of FIG. 23.

The light transmission unit 312 includes a base plate 314, on which a plurality of light emitting diodes (LED) are radially arranged as shown in FIG. 24. The light transmission unit 312 is freed via a thermally-conductive sheet 315 to the light shielding plate 311 and the light reception unit 313.

Figure 25:
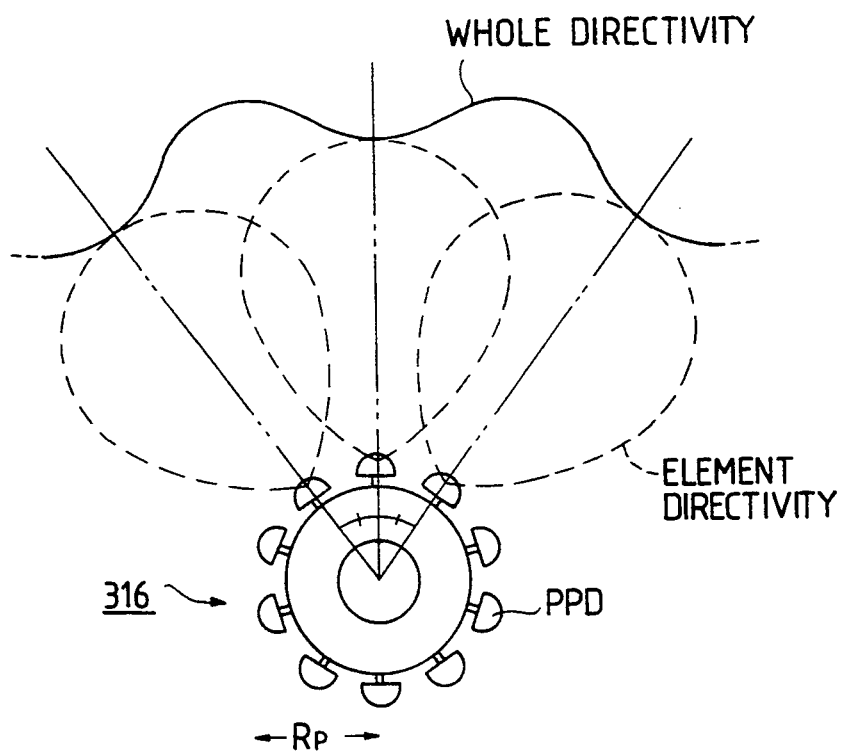
FIG. 25 is a plan view of the pin photodiodes in the embodiment of FIG. 23.

The light reception unit 313 includes a base plate 316, on which a plurality of pin photodiodes (PPD) are radially arranged as shown in FIG. 25. A visible-light cutting filter 317 extending below the light reception unit 313 covers the pin photodiodes.

Figure 26:
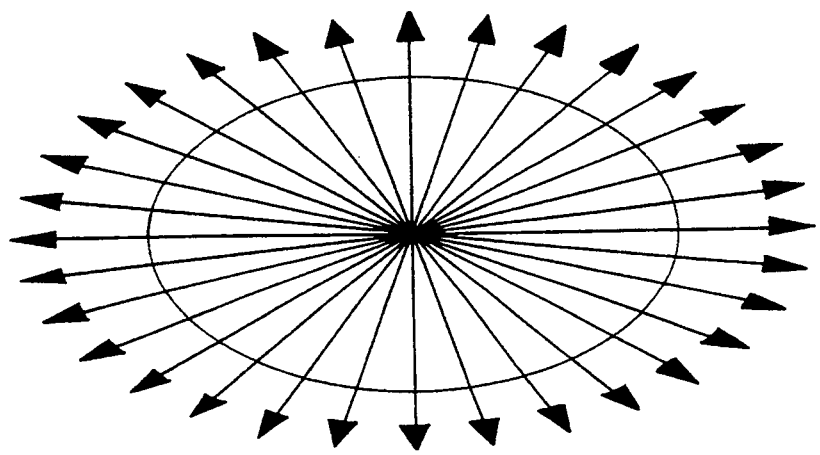
FIG. 26 is a diagram showing the directivity of the arrangement of the light emitting diodes in the embodiment of FIG. 23.

As shown in FIG. 24, the base plate 314 is composed of a printed circuit board having a central opening through which wiring lines pass. The light emitting diodes LED are radially arranged on the outer edge of the base plate 314. The light emitting diodes are activated by a driver circuit (not shown). The light emitting diodes LED are spaced at equal angular intervals smaller than a half-value angle (a light radiation angle at which a radiated light amount is halved), so that the quantities of light emitted from adjacent light emitting diodes will be added. The characteristics of the horizontal directivity of the whole arrangement of the light emitting diodes are denoted by the solid line of FIG. 24, and light can be horizontally emitted through a wide range of 360 degrees. The vertical directivity of the whole arrangement of the light emitting diodes simply reflect the vertical directivities of the respective light emitting diodes. As a result, the whole arrangement of the light emitting diodes has a narrow vertical directivity. Thus, the resultant directivity of the whole arrangement of the light emitting didoes substantially corresponds to horizontal and radial directions as shown in FIG. 26.

This directivity of the whole arrangement of the light emitting diodes is good for a host device 400 which is placed on a common plane where repeaters 410 are placed as shown in FIG. 27. Specifically, both of the host device 400 and the repeaters 410 are attached to a ceiling 420 of a room.

Figure 28:
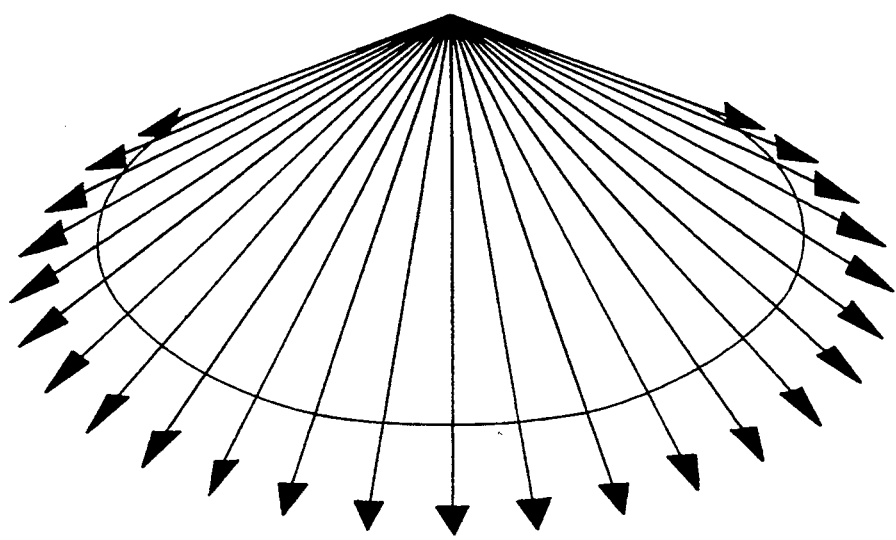
FIG. 28 is a diagram showing the directivity of a modified arrangement of the light emitting diodes in the embodiment of FIG. 23.

The light emitting diodes may be directed slightly downward so that the whole arrangement of the light emitting diodes will have a conically downward directivity as shown in FIG. 28. This directivity of the whole arrangement of the light emitting diodes is good for repeaters.

As shown in FIG. 25, the base plate 316 is composed of a printed circuit board having a central opening through which wiring lines pass. The pin photodiodes PPD are radially arranged on the outer edge of the base plate 316. The pin photodiodes are electrically connected to a signal processing circuit (not shown). The pin photodiodes PPD are spaced at equal angular intervals smaller than a half-value angle (a light reception angle at which a received light amount is halved). The characteristics of the horizontal directivity of the whole arrangement of the pin photodiodes are denoted by the solid line of FIG. 25. Thus, light can be received through a wide range of 360 degrees without any dead point. The vertical directivity of the whole arrangement of the pin photodiodes simply reflect the vertical directivities of the respective pin photodiodes. As a result, the whole arrangement of the pin photodiodes has a narrow vertical directivity. Thus, the resultant directivity of the whole arrangement of the pin photodiodes substantially corresponds to horizontal and radial directions.

This divectivity of the whole arrangement of the pin photodiodes is good for a host device which is placed on a common plane where repeaters are placed.

The pin photodiodes may be directed slightly downward so that the whole arrangement of the pin photodiodes will have a cortically downward directivity. This directivity of the whole arrangement of the pin photodiodes is good for repeaters.

With reference to FIGS. 23–25, the radius RL of the circle along which the light emitting diodes LED are arranged is greater than the radius RP of the circle along which the pin photodiodes PPD are arranged. The base plate 316 of the light reception unit 313 is located below the base plate 314 of the light transmission unit 312.

The light emitting diodes LED on the base plate 314 are directed substantially horizontally. The pin photodiodes PPD on the base plate 316 are directed substantially horizontally.

The light shielding plate 311 includes a metal disc located between the light transmission unit 312 and the light reception unit 313. The outer portion 311A of the light shielding plate 311 is bent downward. The light shielding plate 311 provides an optical isolation between the light transmission unit 312 and the light reception unit 313 so that feedback of light from the light transmission unit 312 to the light reception unit 313 can be suppressed. In addition, the vertically-separated arrangement of the light transmission unit 312 and the light reception unit 313, and the narrow vertical directivities of the light transmission unit 312 and the light reception unit 313 further enhance the optical isolation between the light transmission unit 312 and the light reception unit 313.

The light shielding plate 311 also provides an electromagnetic isolation between the light transmission unit 312 and the light reception unit 313 so that electromagnetic interference between the light transmission unit 312 and the light reception unit 313 can be suppressed.

As is well-known, the activation of the light emitting diodes LED generate a certain mount of heat. The generated heat can efficiently escape from the light emitting diodes LED via the base plate 314, the thermally-conductive sheet 315, and the light shielding plate 311.

What is claimed is:

1. An optical radio system comprising a host device, an end device and a repeater, wherein the host device and the end device communicate with each other via the repeater by use of light signals; and wherein the repeater comprises;

first means for receiving a first light signal from one of the host device and the end device;

second means connected to the first means for converting the first light signal received by the first means into a first electric signal;

third means connected to the second means for frequency-converting the first electric signal into a second electric signal;

fourth means connected to the third means for generating a second light signal in response to the second electric signal and transmitting the generated second light signal when enabled;

fifth means connected to the second means and the third means for demodulating one of the first electric signal and the second electric signal into a baseband signal;

sixth means connected to the fifth means for detecting the quality of the baseband signal; and seventh means connected to the fourth means and the sixth means for enabling transmission of the second light signal by the fourth means only when the baseband signal quality detected by the sixth means is equal to or greater than a predetermined quality.

2. The optical radio system of claim 1 wherein the sixth means comprises means for detecting a quality of the head portion of the baseband signal, the head portion having a predetermined start signal pattern.

3. The optical radio system of claim 2 wherein the repeater comprises means for detecting an amount of jitter of the baseband signal in the head portion, means for deciding whether the detected amount of jitter is equal to or less than a predetermined amount, and means for enabling transmission of the second light signal by the fourth means when the detected amount of the jitter is decided to be equal to or less than the predetermined amount.

4. The optical radio system of claim 2 wherein the repeater comprises means for detecting jitter of the baseband signal in the head portion, means for integrating the detected jitter into an integration jitter value for a predetermined time, means for deciding whether the integration jitter value is equal to or less than a predetermined value, and means for enabling transmission of the second light signal by the fourth means when the integration jitter value is decided to be equal to or less than the predetermined value.

5. The optical radio system of claim 2 wherein the repeater comprises means for detecting noise components of the baseband signal in the head portion, means for deciding whether a level of the detected noise components is equal to or less than a predetermined level, and means for enabling transmission of the second light signal by the fourth means when the level of the detected noise components is decided to be equal to or less than the predetermined level.

6. The optical radio system of claim 2 wherein the repeater comprises means for detecting noise components of the baseband signal in the head portion, means for integrating the detected noise components into an integration noise value for a predetermined time, means for deciding whether the integration noise value is equal to or less than a predetermined value, and means for enabling transmission of the second light signal by the fourth means when the integration noise value is decided to be equal to or less than the predetermined value.

7. The optical radio system of claim 1 wherein the repeater comprises means for detecting a predetermined pattern in a head portion of the baseband signal, and means for starting transmission of the second light signal by the fourth means when the predetermined pattern is detected.

8. The optical radio system of claim 1 wherein the repeater comprises means for detecting a predetermined pattern in an end portion of the baseband signal, and means for ending transmission of the second light signal by the fourth means when the predetermined pattern is detected.

9. The optical radio system of claim 1 wherein the host device and the repeater comprise respective light transmitting/receiving sections, wherein each of the light transmitting/receiving sections comprises a light transmission unit and a light reception unit, the light transmission unit including radially-arranged light emitting elements which are spaced at equal predetermined angular intervals smaller than a half-value angle of a directivity, the light reception unit including radially-arranged light receiving elements which are spaced at equal predetermined angular intervals smaller than a half-value angle of a directivity.

10. The optical radio system of claim 9 wherein each of the light transmitting/receiving sections comprises a light shielding member disposed between the light transmission unit and the light reception unit for providing an optical isolation between the light transmission unit and the light reception unit.

11. A repeater for an optical radio communication network, comprising:

means for receiving a first light signal, and converting the first light signal into a first electric signal;

means connected to the first means for generating a second electric signal in response to the first electric signal;

transmitting means connected to the generating means for converting the second electric signal into a second light signal, and transmitting the second light signal when enabled;

means connected to the receiving means and the generating means for detecting a condition of one of the first electric signal and the second electric signal; and means connected to the transmitting means and the detecting means for selectively enabling and disabling the transmitting means in response to the condition of one of the first electric signal and the second electric signal which is detected by the detecting means.

12. The repeater of claim 11 wherein the detecting means comprises means for detecting a level of one of the first electric signal and the second electric signal as a condition of one of the first electric signal and the second electric signal.

13. The repeater of claim 11 wherein the detecting means comprises means for detecting a quality of one of the first electric signal and the second electric signal as a condition of one of the first electric signal and the second electric signal.

14. The repeater of claim 11 wherein the detecting means comprises means for detecting a noise component of one of the first electric signal and the second electric signal as a condition of one of the first electric signal and the second electric signal.

15. The repeater of claim 11 wherein the detecting means comprises means for detecting a jitter component of one of the first electric signal and the second electric signal as a condition of one of the first electric signal and the second electric signal.

16. The repeater of claim 11 wherein the generating means comprises means for doubling a frequency of the first electric signal to convert the first electric signal into the second electric signal.

* * * * *

UNITED STATES PATENT AND TRADEMARK OFFICE
CERTIFICATE OF CORRECTION

PATENT NO. : 5,349,463
DATED : September 20, 1994
INVENTOR(S) : Kazutoshi Hirohashi, et al It is certified that error appears in the above-indentified patent and that said Letters Patent is hereby corrected as shown below:

On the title page item [73], should read --Victor Company of Japan, Ltd. Yokohama, Japan--

Signed and Sealed this

Twenty-first Day of February, 1995

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,349,463

DATED : September 20, 1994

INVENTOR(S) : Kazutoshi HIROHASHI et al.

It is certified that error appears in the above-indentified patent and that said Letters Patent is hereby corrected as shown below:

On the title page, please delete item [73] and insert the following therefor:

--[73] Assignees: Victor Company of Japan, Ltd., Yokohama; NTT Data Communications Systems Corporation, Tokyo, both of Japan--

Signed and Sealed this

Second Day of May, 1995

Attest:

BRUCE LEHMAN

Attesting Officer

Commissioner of Patents and Trademarks